(12) United States Patent
Kons

(10) Patent No.: US 11,817,987 B2
(45) Date of Patent: Nov. 14, 2023

(54) DIGITAL COMMUNICATION USING DISPERSED ORTHOGONAL TIME FREQUENCY SPACE MODULATED SIGNALS

(71) Applicant: Cohere Technologies, Inc., Santa Clara, CA (US)

(72) Inventor: Shachar Kons, Santa Clara, CA (US)

(73) Assignee: Cohere Technologies, Inc., San Jose, CA (US)

( * ) Notice: Subject to any disclaimer, the term of this patent is extended or adjusted under 35 U.S.C. 154(b) by 840 days.

(21) Appl. No.: 16/604,968

(22) PCT Filed: Apr. 10, 2018

(86) PCT No.: PCT/US2018/026971
§ 371 (c)(1),
(2) Date: Oct. 11, 2019

(87) PCT Pub. No.: WO2018/191309
PCT Pub. Date: Oct. 18, 2018

(65) Prior Publication Data
US 2023/0164013 A1     May 25, 2023

Related U.S. Application Data

(60) Provisional application No. 62/484,303, filed on Apr. 11, 2017.

(51) Int. Cl.
*H04L 27/26*     (2006.01)
*H04L 5/00*     (2006.01)
*H04L 25/03*     (2006.01)

(52) U.S. Cl.
CPC ........ *H04L 27/2627* (2013.01); *H04L 5/0023* (2013.01); *H04L 5/0041* (2013.01);
(Continued)

(58) Field of Classification Search
CPC ............. H04L 27/26134; H04L 5/0023; H04L 5/0041; H04L 25/03006; H04L 27/2627; H04L 27/2639
See application file for complete search history.

(56) References Cited

U.S. PATENT DOCUMENTS 4,754,493 A    6/1988    Coates
5,083,135 A    1/1992    Nagy et al.
(Continued)

FOREIGN PATENT DOCUMENTS

CN     1235720 A    11/1999
CN     101682316 A    3/2010
(Continued)

OTHER PUBLICATIONS

Office Action for U.S. Appl. No. 13/117,119, dated Aug. 5, 2013, 5 pages.
(Continued)

*Primary Examiner* — Duc C Ho
(74) *Attorney, Agent, or Firm* — Perkins Coie LLP

(57) ABSTRACT

Wireless communication transmission and reception techniques are described. At transmitter, source data bits are modulated into a number Nd of constellation symbols. An invertible transform is applied to the constellation symbols, thereby resulting in mapping the transformed symbols into Nd elements in the time-frequency grid. A signal resulting from the invertible transform is transmitted over a communication channel.

30 Claims, 30 Drawing Sheets

(52) U.S. Cl.
CPC ...... *H04L 5/0048* (2013.01); *H04L 25/03006* (2013.01); *H04L 27/2639* (2013.01); *H04L 27/2649* (2013.01); *H04L 27/26134* (2021.01); *H04L 27/26532* (2021.01)

(56) References Cited

U.S. PATENT DOCUMENTS

| | | | |
|---|---|---|---|
| 5,182,642 | A | 1/1993 | Gersdorff et al. |
| 5,623,511 | A | 4/1997 | Bar-David et al. |
| 5,831,977 | A | 11/1998 | Dent |
| 5,872,542 | A | 2/1999 | Simons et al. |
| 5,956,624 | A | 9/1999 | Hunsinger et al. |
| 6,212,246 | B1 | 4/2001 | Hendrickson |
| 6,289,063 | B1 | 9/2001 | Duxbury |
| 6,356,555 | B1 | 3/2002 | Rakib et al. |
| 6,388,621 | B1 | 5/2002 | Lynch |
| 6,426,983 | B1 | 7/2002 | Rakib et al. |
| 6,608,864 | B1 | 8/2003 | Strait |
| 6,631,168 | B2 | 10/2003 | Izumi |
| 6,704,366 | B1 | 3/2004 | Combes et al. |
| 6,956,814 | B1 | 10/2005 | Campanella |
| 7,010,048 | B1 | 3/2006 | Shattil |
| 7,327,812 | B2 | 2/2008 | Auer |
| 7,392,018 | B1 | 6/2008 | Ebert et al. |
| 7,689,049 | B2 | 3/2010 | Monro |
| 7,773,685 | B2 | 8/2010 | Tirkkonen et al. |
| 7,864,877 | B2 | 1/2011 | Hottinen |
| 8,229,017 | B1 | 7/2012 | Lee et al. |
| 8,259,845 | B2 | 9/2012 | Dent |
| 8,401,131 | B2 | 3/2013 | Fety et al. |
| 8,547,988 | B2 | 10/2013 | Hadani et al. |
| 8,619,892 | B2 | 12/2013 | Vetter et al. |
| 8,717,210 | B2 | 5/2014 | Eldar et al. |
| 8,879,378 | B2 | 11/2014 | Rakib et al. |
| 8,892,048 | B1 | 11/2014 | Turner |
| 8,976,851 | B2 | 3/2015 | Hadani et al. |
| 9,031,141 | B2 | 5/2015 | Hadani et al. |
| 9,071,285 | B2 | 6/2015 | Hadani et al. |
| 9,071,286 | B2 | 6/2015 | Hadani et al. |
| 9,083,483 | B1 | 7/2015 | Rakib et al. |
| 9,083,595 | B2 | 7/2015 | Rakib et al. |
| 9,130,638 | B2 | 9/2015 | Hadani et al. |
| 9,282,528 | B2 | 3/2016 | Hashimoto |
| 9,294,315 | B2 | 3/2016 | Hadani et al. |
| 9,444,514 | B2 | 9/2016 | Hadani et al. |
| 9,548,840 | B2 | 1/2017 | Hadani et al. |
| 9,553,984 | B2 | 1/2017 | Krause et al. |
| 9,590,779 | B2 | 3/2017 | Hadani et al. |
| 9,634,719 | B2 | 4/2017 | Rakib et al. |
| 9,660,851 | B2 | 5/2017 | Hadani et al. |
| 9,668,148 | B2 | 5/2017 | Hadani et al. |
| 9,712,354 | B2 | 7/2017 | Hadani et al. |
| 9,729,281 | B2 | 8/2017 | Hadani et al. |
| 9,929,783 | B2* | 3/2018 | Rakib ................ H04L 27/2655 |
| 10,020,854 | B2* | 7/2018 | Hadani ................ H04L 5/0016 |
| 2001/0031022 | A1 | 10/2001 | Petrus et al. |
| 2001/0033614 | A1 | 10/2001 | Hudson |
| 2001/0046205 | A1 | 11/2001 | Easton et al. |
| 2002/0001308 | A1 | 1/2002 | Heuer |
| 2002/0034191 | A1 | 3/2002 | Shattil |
| 2002/0181388 | A1 | 12/2002 | Jain et al. |
| 2002/0181390 | A1 | 12/2002 | Mody et al. |
| 2002/0181607 | A1 | 12/2002 | Izumi |
| 2003/0073464 | A1 | 4/2003 | Giannakis et al. |
| 2003/0185295 | A1 | 10/2003 | Yousef |
| 2003/0235147 | A1 | 12/2003 | Walton et al. |
| 2004/0044715 | A1 | 3/2004 | Aldroubi et al. |
| 2004/0174812 | A1 | 9/2004 | Murakami et al. |
| 2004/0189581 | A1 | 9/2004 | Sako et al. |
| 2004/0218523 | A1 | 11/2004 | Varshney et al. |
| 2005/0157778 | A1 | 7/2005 | Trachewsky et al. |
| 2005/0157820 | A1 | 7/2005 | Wongwirawat et al. |
| 2005/0180517 | A1 | 8/2005 | Abe |
| 2005/0207334 | A1 | 9/2005 | Hadad |
| 2005/0251844 | A1 | 11/2005 | Martone et al. |
| 2006/0008021 | A1 | 1/2006 | Bonnet |
| 2006/0039270 | A1 | 2/2006 | Strohmer et al. |
| 2007/0014272 | A1 | 1/2007 | Palanki et al. |
| 2007/0038691 | A1 | 2/2007 | Candes et al. |
| 2007/0078661 | A1 | 4/2007 | Sriram et al. |
| 2007/0104283 | A1 | 5/2007 | Han et al. |
| 2007/0110131 | A1 | 5/2007 | Guess et al. |
| 2007/0211952 | A1 | 9/2007 | Faber et al. |
| 2007/0237181 | A1 | 10/2007 | Cho et al. |
| 2007/0253465 | A1 | 11/2007 | Muharemovic et al. |
| 2007/0253504 | A1 | 11/2007 | Hasegawa |
| 2008/0043857 | A1 | 2/2008 | Dias et al. |
| 2008/0117999 | A1 | 5/2008 | Kadous et al. |
| 2008/0186843 | A1 | 8/2008 | Ma et al. |
| 2008/0187062 | A1 | 8/2008 | Pan et al. |
| 2008/0232504 | A1 | 9/2008 | Ma et al. |
| 2008/0310383 | A1 | 12/2008 | Kowalski |
| 2009/0080403 | A1 | 3/2009 | Hamdi |
| 2009/0092259 | A1 | 4/2009 | Jot et al. |
| 2009/0103593 | A1 | 4/2009 | Bergamo |
| 2009/0122854 | A1 | 5/2009 | Zhu et al. |
| 2009/0161804 | A1 | 6/2009 | Chrabieh et al. |
| 2009/0204627 | A1 | 8/2009 | Hadani |
| 2009/0222226 | A1 | 9/2009 | Baraniuk et al. |
| 2009/0303961 | A1 | 12/2009 | Popovic et al. |
| 2010/0001901 | A1 | 1/2010 | Baraniuk et al. |
| 2010/0008432 | A1 | 1/2010 | Kim et al. |
| 2010/0027608 | A1 | 2/2010 | Priotti |
| 2010/0111138 | A1 | 5/2010 | Hosur et al. |
| 2010/0142476 | A1 | 6/2010 | Jiang et al. |
| 2010/0187914 | A1 | 7/2010 | Rada et al. |
| 2010/0238787 | A1 | 9/2010 | Guey |
| 2010/0277308 | A1 | 11/2010 | Potkonjak |
| 2010/0303136 | A1 | 12/2010 | Ashikhmin et al. |
| 2010/0322349 | A1 | 12/2010 | Lee et al. |
| 2011/0007789 | A1 | 1/2011 | Garmany |
| 2011/0110532 | A1 | 5/2011 | Svendsen |
| 2011/0116489 | A1 | 5/2011 | Grandhi |
| 2011/0116516 | A1 | 5/2011 | Hwang et al. |
| 2011/0126071 | A1 | 5/2011 | Han et al. |
| 2011/0131463 | A1 | 6/2011 | Gunnam |
| 2011/0216808 | A1 | 9/2011 | Tong et al. |
| 2011/0286502 | A1 | 11/2011 | Adachi et al. |
| 2011/0287778 | A1 | 11/2011 | Levin et al. |
| 2011/0292971 | A1 | 12/2011 | Hadani et al. |
| 2011/0293030 | A1 | 12/2011 | Rakib et al. |
| 2011/0299379 | A1 | 12/2011 | Sesia et al. |
| 2011/0305267 | A1 | 12/2011 | Riu et al. |
| 2012/0021769 | A1 | 1/2012 | Lindoff et al. |
| 2012/0051457 | A1 | 3/2012 | Ma et al. |
| 2012/0140716 | A1 | 6/2012 | Baldemair et al. |
| 2012/0170684 | A1 | 7/2012 | Yim et al. |
| 2012/0201322 | A1 | 8/2012 | Rakib et al. |
| 2012/0213098 | A1 | 8/2012 | Sun |
| 2012/0235795 | A1 | 9/2012 | Liao et al. |
| 2012/0269201 | A1 | 10/2012 | Atungsiri et al. |
| 2012/0272117 | A1 | 10/2012 | Stadelmeier et al. |
| 2012/0320994 | A1 | 12/2012 | Loghin et al. |
| 2013/0021977 | A1 | 1/2013 | Yang et al. |
| 2013/0058390 | A1 | 3/2013 | Haas et al. |
| 2013/0077579 | A1 | 3/2013 | Cho et al. |
| 2013/0083661 | A1 | 4/2013 | Gupta et al. |
| 2013/0121497 | A1 | 5/2013 | Smaragdis et al. |
| 2013/0230010 | A1 | 9/2013 | Kim et al. |
| 2013/0260787 | A1 | 10/2013 | Hashimoto |
| 2013/0279627 | A1 | 10/2013 | Wu et al. |
| 2013/0315133 | A1 | 11/2013 | Wang et al. |
| 2014/0143639 | A1 | 5/2014 | Loghin et al. |
| 2014/0161154 | A1 | 6/2014 | Hadani et al. |
| 2014/0169385 | A1 | 6/2014 | Hadani et al. |
| 2014/0169406 | A1 | 6/2014 | Hadani et al. |
| 2014/0169433 | A1 | 6/2014 | Hadani et al. |
| 2014/0169436 | A1 | 6/2014 | Hadani et al. |
| 2014/0169437 | A1 | 6/2014 | Hadani et al. |
| 2014/0169441 | A1 | 6/2014 | Hadani et al. |
| 2014/0247803 | A1 | 9/2014 | Arambepola et al. |
| 2014/0348252 | A1 | 11/2014 | Siohan et al. |
| 2014/0364128 | A1 | 12/2014 | Lee et al. |
| 2015/0117395 | A1 | 4/2015 | Hadani et al. |

(56) References Cited

U.S. PATENT DOCUMENTS

| | | |
|---|---|---|
| 2015/0326273 A1 | 11/2015 | Rakib et al. |
| 2015/0327085 A1 | 11/2015 | Hadani et al. |
| 2015/0382231 A1 | 12/2015 | Jabbar et al. |
| 2016/0043835 A1 | 2/2016 | Hadani et al. |
| 2016/0135132 A1 | 5/2016 | Donepudi et al. |
| 2016/0182269 A1 | 6/2016 | Hadani et al. |
| 2016/0191217 A1 | 6/2016 | Hadani et al. |
| 2016/0191280 A1 | 6/2016 | Hadani et al. |
| 2016/0254889 A1 | 9/2016 | Shattil |
| 2016/0277225 A1 | 9/2016 | Frenne et al. |
| 2016/0309345 A1 | 10/2016 | Tehrani et al. |
| 2016/0380743 A1 | 12/2016 | Rakib |
| 2016/0381576 A1 | 12/2016 | Hadani et al. |
| 2017/0012749 A1 | 1/2017 | Rakib et al. |
| 2017/0012810 A1 | 1/2017 | Rakib et al. |
| 2017/0019297 A1 | 1/2017 | Rakib |
| 2017/0033899 A1 | 2/2017 | Rakib et al. |
| 2017/0040711 A1 | 2/2017 | Rakib et al. |
| 2017/0078054 A1 | 3/2017 | Hadani et al. |
| 2017/0099122 A1 | 4/2017 | Hadani et al. |
| 2017/0099607 A1 | 4/2017 | Hadani et al. |
| 2017/0149594 A1 | 5/2017 | Rakib et al. |
| 2017/0149595 A1 | 5/2017 | Rakib et al. |
| 2017/0201354 A1 | 7/2017 | Hadani et al. |
| 2017/0207817 A1 | 7/2017 | Hadani et al. |
| 2017/0222700 A1 | 8/2017 | Hadani et al. |
| 2017/0230215 A1 | 8/2017 | Rakib et al. |
| 2017/0244524 A1 | 8/2017 | Hadani et al. |

FOREIGN PATENT DOCUMENTS

| | | |
|---|---|---|
| CN | 101939935 A | 1/2011 |
| EP | 1432168 A1 | 6/2004 |
| JP | 2011127910 A | 6/2011 |
| WO | 2007004297 | 1/2007 |
| WO | 2011137699 A1 | 11/2011 |
| WO | 2011150315 | 12/2011 |
| WO | 2013148546 | 10/2013 |
| WO | 2014004585 | 1/2014 |
| WO | 2016014596 | 1/2016 |
| WO | 2016014598 | 1/2016 |
| WO | 2016176642 | 11/2016 |
| WO | 2016183230 | 11/2016 |
| WO | 2016183240 | 11/2016 |
| WO | 2016209848 | 12/2016 |
| WO | 2017003952 | 1/2017 |
| WO | 2017011455 A1 | 1/2017 |
| WO | 2017011478 | 1/2017 |

OTHER PUBLICATIONS

Notice of Allowance for U.S. Appl. No. 13/117,119, dated Feb. 28, 2014, 13 pages.
Banelli, P. et al., "Modulation Formats and Waveforms for 5G Networks: Who Will Be the Heir of OFDM?," IEEE Signal Processing Magazine, vol. 81, pp. 80-93, Nov. 2014.
El Hattachi, R. et al., "NGMN 5G Initiative White Paper," NGMN Alliance, Feb. 17, 2015. [Online]. Available: https://www.ngmn.org/uploads/media/NGMN_5G_White_Paper_V1_0.pdf, 125 pages.
Rusek, F. et al., "Scaling Up MIMO, Opportunities and Challenges with Very Large Arrays," IEEE Signal Processing Magazine, pp. 40-60 (2013).
Vodafone, "Cellular Internet of Things: Architectural Aspects," RP-150869, 3GPP RAN#68, Malmo, Sweden (Jun. 9, 2015), 19 pages.
Supplementary European Search Report for European Application No. 11787483.4, dated Sep. 9, 2014, 6 pages.
International Search Report and Written Opinion for International Application No. PCT/US2011/038302, dated Nov. 15, 2011, 8 pages.
International Preliminary Report on Patentability for International Application No. PCT/US2011/038302, dated Dec. 4, 2012, 7 pages.
Office Action for U.S. Appl. No. 13/117,124, dated Feb. 22, 2013, 7 pages.
Notice of Allowance for U.S. Appl. No. 13/117,124, dated Aug. 8, 2013, 10 pages.
Office Action for U.S. Appl. No. 14/605,957, dated Jun. 22, 2017, 6 pages.
Supplementary European Search Report for European Application No. 13809004.8, dated Apr. 14, 2016, 8 pages.
Communication Pursuant to Article 94(3) EPC for European Application No. 13809004.8, dated Feb. 17, 2017, 5 pages.
Notice of Allowance for U.S. Appl. No. 13/927,087, dated Feb. 25, 2015, 9 pages.
Office Action for U.S. Appl. No. 13/927,087, dated Nov. 12, 2014, 14 pages.
Gurevich, S. et al. "Group Representation Design of Digital Signals and Sequences," S.W. Golomb et al. (eds.), SETA 2008, LNCS 5203, pp. 153-166, Springer-Verlag Berlin Heidelberg (2008).
International Search Report and Written Opinion for International Application No. PCT/US2013/047723, dated Oct. 29, 2013, 17 pages.
International Preliminary Report on Patentability for International Application No. PCT/US2013/047723, dated Dec. 31, 2014, 15 pages.
Notice of Allowance for U.S. Appl. No. 13/927,088, dated Feb. 18, 2015, 7 pages.
Office Action for U.S. Appl. No. 13/927,088, dated Nov. 28, 2014, 13 pages.
Notice of Allowance for U.S. Appl. No. 13/927,086, dated Dec. 26, 2014, 8 pages.
Supplemental Notice of Allowability for U.S. Appl. No. 13/927,086, dated Mar. 19, 2015, 4 pages.
Office Action for U.S. Appl. No. 13/927,086, dated Oct. 14, 2014, 10 pages.
Office Action for U.S. Appl. No. 13/927,089, dated Dec. 24, 2014, 13 pages.
Office Action for U.S. Appl. No. 13/927,089, dated Aug. 14, 2015, 7 pages.
Supplemental Notice of Allowability for U.S. Appl. No. 13/927,091, dated Jun. 11, 2015, 4 pages.
Notice of Allowance for U.S. Appl. No. 13/927,091, dated Apr. 24, 2015, 8 pages.
Office Action for U.S. Appl. No. 13/927,091, dated Jan. 27, 2015, 15 pages.
Office Action for U.S. Appl. No. 13/927,092, dated Oct. 8, 2014, 5 pages.
Notice of Allowance for U.S. Appl. No. 13/927,092, dated Oct. 24, 2014, 7 pages.
Office Action for U.S. Appl. No. 13/927,095, dated Apr. 30, 2015, 11 pages.
Office Action for U.S. Appl. No. 13/927,095, dated Nov. 4, 2015, 9 pages.
Office Action for U.S. Appl. No. 13/927,095, dated Jun. 1, 2016, 10 pages.
Office Action for U.S. Appl. No. 14/717,886, dated Apr. 19, 2016, 10 pages.
Office Action for U.S. Appl. No. 14/709,377, dated Dec. 11, 2015, 12 pages.
Office Action for U.S. Appl. No. 14/709,377, dated Jul. 13, 2016, 17 pages.
Examination Report No. 1 for Australian Application No. 2013239970, dated Dec. 8, 2015, 3 pages.
"AT&T Annual Report 2014," Opening Our Network [Online]. Retrieved from the Internet: Sep. 22, 2016. <URL: http://www.att.com/Investor/ATT_Annual/2014/att_introduces_new_concepts_for_telecom_network.html>, 5 pages.
CATT, "UL ACK/NACK transmission methods for LTE-A," 3GPP TSG RAN WG1 Meeting #60bis, R1-102453, Beijing, China, Apr. 12-16, 2010, 8 pages.
Toskala, A. et al., "Physical Layer," Chapter 5 In: "LTE for UMTS: OFDMA and SC-FDMA Based Radio Access," Holma, H. et al. (eds.), John Wiley & Sons, Ltd., United Kingdom, 2009, pp. 83-135.
Mecklenbrauker, W., "A Tutorial on Non-Parametric Bilinear Time-Frequency Signal Representations," In: Time and Frequency Rep-

(56) References Cited

OTHER PUBLICATIONS resentation of Signals and Systems, Longo, G. et al. (eds.), Springer-Verlag Wien, vol. 309, pp. 11-68 (1989).
Nehorai, A. et al., "MURI: Adaptive waveform design for full spectral dominance (2005-2010)," AFOSR FA9550-05-1-0443, Final Report, [online], Mar. 11, 2011 Retrieved on May 11, 2013, Retrieved from the Internet <URL: http://oai.dtic.mil/oai/oai?verb=getRecord&metadataPrefix=html&identifier=ADA565420>, 103 pages.
Office Action for Japanese Application No. 2015-518647, dated Jul. 7, 2015, 10 pages.
Office Action for U.S. Appl. No. 14/754,596, dated Apr. 19, 2016, 18 pages.
Office Action for U.S. Appl. No. 14/809,129, dated Jul. 19, 2016, 5 pages.
Office Action for U.S. Appl. No. 15/617,962, dated Sep. 6, 2017, 10 pages.
International Search Report and Written Opinion for International Application No. PCT/US2016/050825, dated Feb. 8, 2017, 12 pages.
International Search Report and Written Opinion for International Application No. PCT/US2016/052524, dated Dec. 20, 2016, 8 pages.
Office Action for U.S. Appl. No. 15/374,995, dated Aug. 7, 2017, 6 pages.
International Search Report and Written Opinion for International Application No. PCT/US2017/025797, dated Jun. 21, 2017, 6 pages.
International Search Report and Written Opinion for International Application No. PCT/US2016/030259, dated Aug. 4, 2016, 13 pages.
Office Action for U.S. Appl. No. 15/152,464, dated Apr. 6, 2017, 10 pages.
Examination Report No. 1 for Australian Application No. 2013280487, dated May 2, 2016, 3 pages.
International Search Report and Written Opinion for International Application No. PCT/US2016/031928, dated Oct. 7, 2016, 10 pages.
Office Action for U.S. Appl. No. 15/188,946, dated May 8, 2017, 14 pages.
International Search Report and Written Opinion for International Application No. PCT/US2016/038584, dated Sep. 26, 2016, 8 pages.
Office Action for U.S. Appl. No. 15/187,668, dated Feb. 16, 2017, 6 pages.
International Search Report and Written Opinion for International Application No. PCT/US2016/031909, dated Aug. 11, 2016, 13 pages.
Office Action for U.S. Appl. No. 15/194,494, dated May 5, 2017, 16 pages.
International Search Report and Written Opinion for International Application No. PCT/US2016/039662, dated Nov. 29, 2016, 14 pages.
Office Action for U.S. Appl. No. 15/436,653, dated Jun. 2, 2017, 10 pages.
Office Action for U.S. Appl. No. 15/208,545, dated Aug. 21, 2017, 15 pages.
International Search Report and Written Opinion for International Application No. PCT/US2016/041940, dated Oct. 20, 2016, 8 pages.
Supplementary European Search Report for European Application No. 13768150.8, dated Oct. 30, 2015, 7 pages.
International Search Report and Written Opinion for International Application No. PCT/US2013/033652, dated Jun. 12, 2013, 8 pages.
International Search Report and Written Opinion for International Application No. PCT/US2015/041417, dated Oct. 1, 2015, 7 pages.
Office Action for U.S. Appl. No. 14/805,407, dated Dec. 14, 2016, 7 pages.
International Search Report and Written Opinion for International Application No. PCT/US2015/041420, dated Oct. 1, 2015, 6 pages.
Extended European Search Report for Application No. 18785008.6 dated Dec. 9, 2020, 11 pages.
Berrou: "Codes and Turbo Codes", Jan. 1, 2010, pp. 359-412.
Zhang et al.: "Hierarchical MMSE linear equalization for multilayer coded modulation", Communications, Circuits and Systems, 2009. ICCCAS 2009. International Conference on, IEEE, Piscataway, NJ, USA, Jul. 23, 2009, pp. 164-168.

* cited by examiner

DIGITAL COMMUNICATION USING DISPERSED ORTHOGONAL TIME FREQUENCY SPACE MODULATED SIGNALS

CROSS REFERENCE TO RELATED APPLICATIONS

The present patent document is a 371 National Phase application of PCT Application No. PCT/US2018/026971 entitled "DIGITAL COMMUNICATION USING DISPERSED ORTHOGONAL TIME FREQUENCY SPACE MODULATED SIGNALS" filed on Apr. 10, 2018, which claims priority to U.S. Provisional Patent Application No. 62/484,303 entitled "DIGITAL COMMUNICATION USING DISPERSED ORTHOGONAL TIME FREQUENCY SPACE MODULATED SIGNALS" filed on Apr. 11, 2017. The entire contents of the aforementioned patent applications are incorporated by reference as part of the disclosure of this patent document.

TECHNICAL FIELD

The present document relates to wireless communication, and more particularly, to digital communications using orthogonal time frequency space (ORFS) domain modulated signals.

BACKGROUND

Due to an explosive growth in the number of wireless user devices and the amount of wireless data that these devices can generate or consume, current wireless communication networks are fast running out of bandwidth to accommodate such a high growth in data traffic and provide high quality of service to users.

Various efforts are underway in the telecommunication industry to come up with next generation of wireless technologies that can keep up with the demand on performance of wireless devices and networks.

SUMMARY

This document discloses digital communication transmission and reception techniques using dispersed orthogonal time frequency space (OTFS) modulation schemes.

In one example aspect, a wireless communication method is disclosed. Using the method, at a transmitter, source data bits are modulated into a number Nd of constellation symbols. An invertible transform is applied to the constellation symbols, thereby resulting in mapping the transformed symbols into Nd elements in the time-frequency grid. A signal resulting from the invertible transform is transmitted over a communication channel.

In another example aspect, a wireless communication reception method is disclosed. The method includes receiving a signal comprising a logical grouping of Nd symbols arranged in a time-frequency grid, generating equalized symbols by equalizing the signal by estimating a channel over which the signal is received, transforming the equalized symbols using an invertible transform into Nd estimated received symbol constellations, and recovering source data bits from the Nd estimated received symbol constellations.

In yet another example aspect, a wireless communication apparatus is disclosed. The apparatus includes a memory and a processor wherein the processor is configured to read instructions from the memory and implement one of the above-described methods.

In yet another example aspect, the above described methods can be embodied as processor-executable code stored in a processor-readable memory.

These, and other, features are described in this document.

DESCRIPTION OF THE DRAWINGS

Drawings described herein are used to provide a further understanding and constitute a part of this application. Example embodiments and illustrations thereof are used to explain the technology rather than limiting its scope.

DETAILED DESCRIPTION

To make the purposes, technical solutions and advantages of this disclosure more apparent, various embodiments are described in detail below with reference to the drawings. Section headings are used in the present document for ease of explanation only and do not limit scope of the disclosed embodiments only to those sections. Accordingly, embodiments and features in various sections of the present document may be combined with each other.

Orthogonal Time Frequency Space (OTFS) is a modulation technique, where constellation symbols are placed on a regular grid in the delay-Doppler dimension, converted using a Symplectic Fourier transform to symbols in the time-frequency domain and then transmitted over a wireless channel. Standard OFDM modulators may be used to transmit these time-frequency symbols. The OTFS reciprocal domains (delay-Doppler and time-frequency) have a physical meaning and can be analytically formulated with reasonable complexity. However, the regularity of these reciprocal grids has restrictions such as placement of additional reference signals in time-frequency grid for channel estimation, or postponing parts of the signal to be transmitted to a later separate transmission. For example, reference signal for OTFS can only be placed outside of the reciprocal grid, regularly inside the reciprocal grid or overlaid on top of the reciprocal grid. Each one of these methods, has drawbacks that make these solutions inefficient, more complex or with degraded performance.

Some embodiments that use the Dispersed OTFS technology discussed herein overcome these limitations by replacing the physical delay-Doppler domain with a virtual domain named "Spread domain". This domain is may not be physically reciprocal to the time-frequency domain. Constellation symbols in this domain are converted to different symbols using an invertible transform and placed on non-regular resources in the time-frequency grid.

Figure 1:
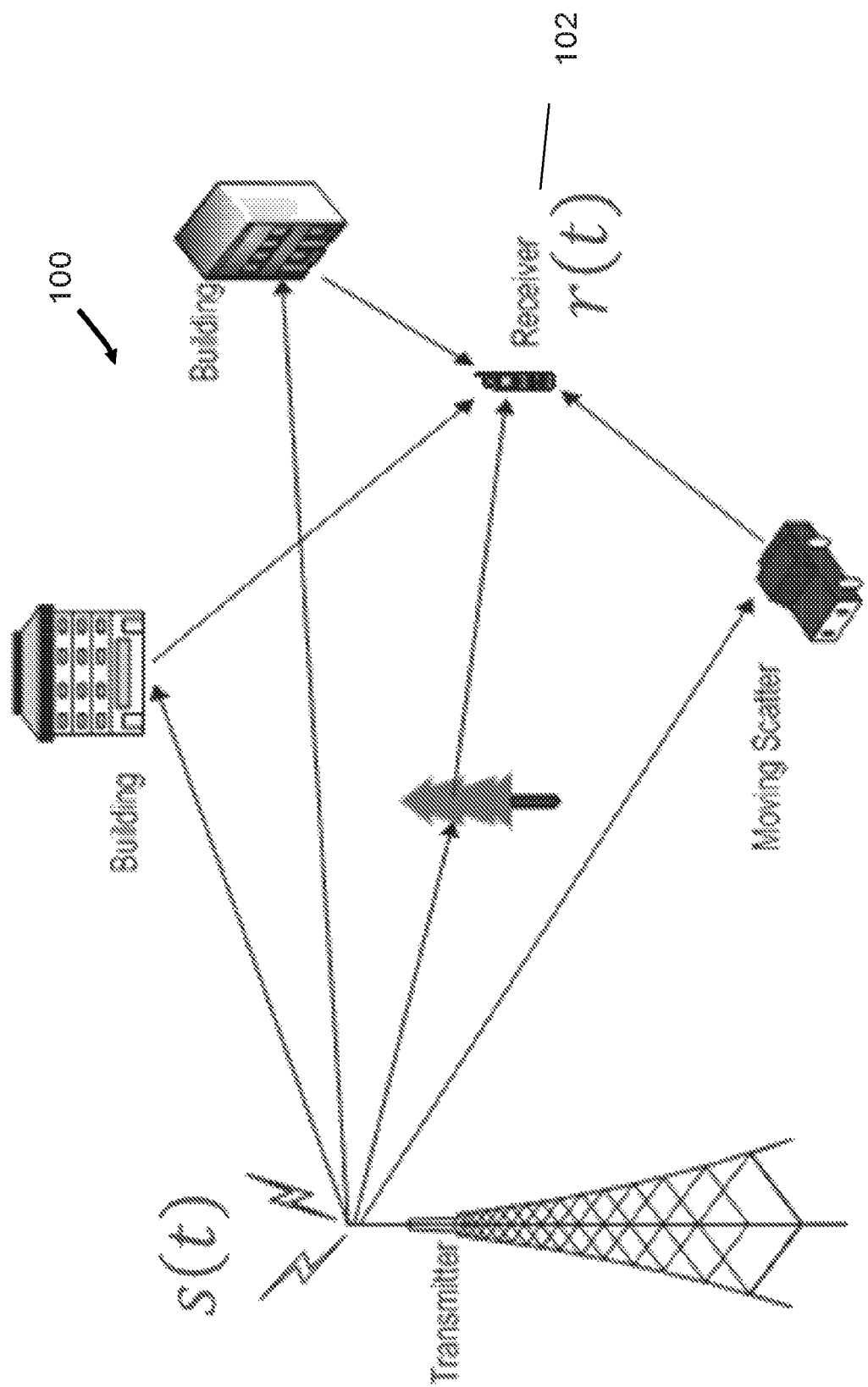
FIG. 1 shows an example communication network.

FIG. 1 shows an example communication network 100 in which the disclosed technologies can be implemented. The network 100 may include a base station transmitter that transmits wireless signals s(t) (downlink signals) to one or more receivers 102, the received signal being denoted as r(t), which may be located in a variety of locations, including inside or outside a building and in a moving vehicle. The receivers may transmit uplink transmissions to the base station, typically located near the wireless transmitter. The technology described herein may be implemented at a receiver 102, or in the base station.

Figure 2:
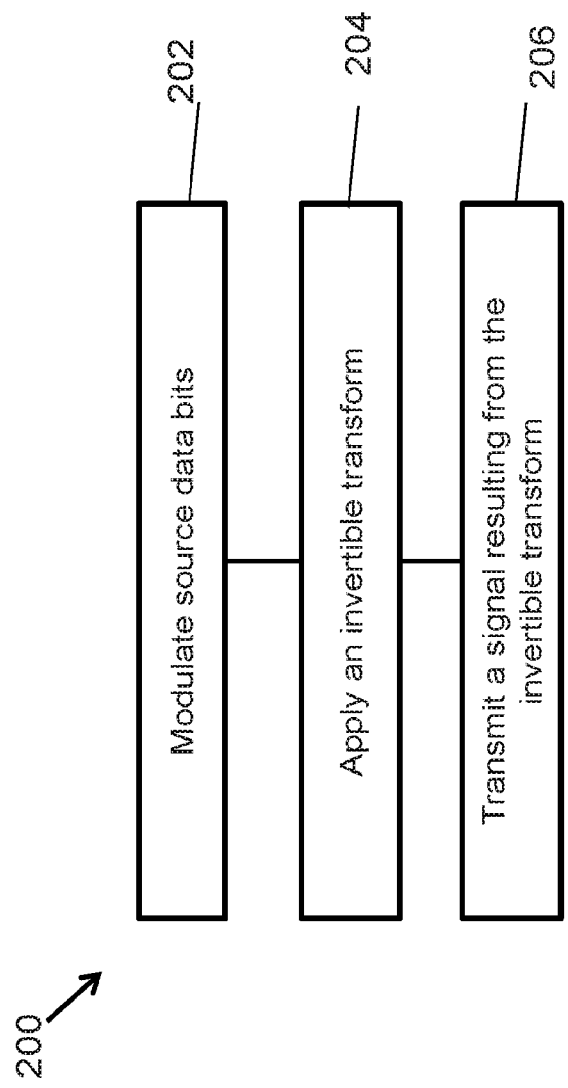
FIG. 2 shows a flowchart of an example wireless communication transmission method.

FIG. 2 is a flowchart representation of an example wireless communication method 200. The method 200 may be implemented by a wireless transmission apparatus such as a base station or an UE.

At 202, source data bits are modulated into a number Nd of constellation symbols. For example, in some embodiments, the modulating the source data bits includes modulating the source data bits using a multi-layer coding technique in which different constellation bits of a symbol are encoded separately. In some embodiments, the number Nd of constellation symbols are constructed from interleaved coded bits. Additional embodiments are described with respect to FIGS. 4 to 16, as further described throughout the present document.

At 204, an invertible transform is applied to the constellation symbols, resulting in mapping the transformed symbols into Nd elements in a time-frequency grid. As described with respect to FIGS. 4 to 16, in some embodiments, the mapping in the time-frequency grid includes a partial time-frequency grid. In some embodiments, the mapping may include mapping to a full time-frequency grid. For example, the time frequency grid may be a continuous grid along both dimensions. In some embodiments, the time-frequency grid may be non-continuous grid.

As described in the present document, the transform and mapping may result in spreading a given constellation symbol across multiple locations along the time-frequency grid. For example, the multiple locations may be non-contiguous along the time-frequency grid.

At 206, a signal resulting from the invertible transform is transmitted over a communication channel. For transmission, the signal may be generated by inserting a reference signal along the time-frequency grid at locations unoccupied by the transformed symbols. In some embodiments, the signal may be generated by inserting additional data along the time-frequency grid at locations unoccupied by the transformed symbols. As further described in this document, the invertible transform may be a symplectic Fourier transform or a multi-dimensional Fourier transform, or a permutation transform.

Several additional embodiments of the method 200 are described in the present document.

Figure 3:
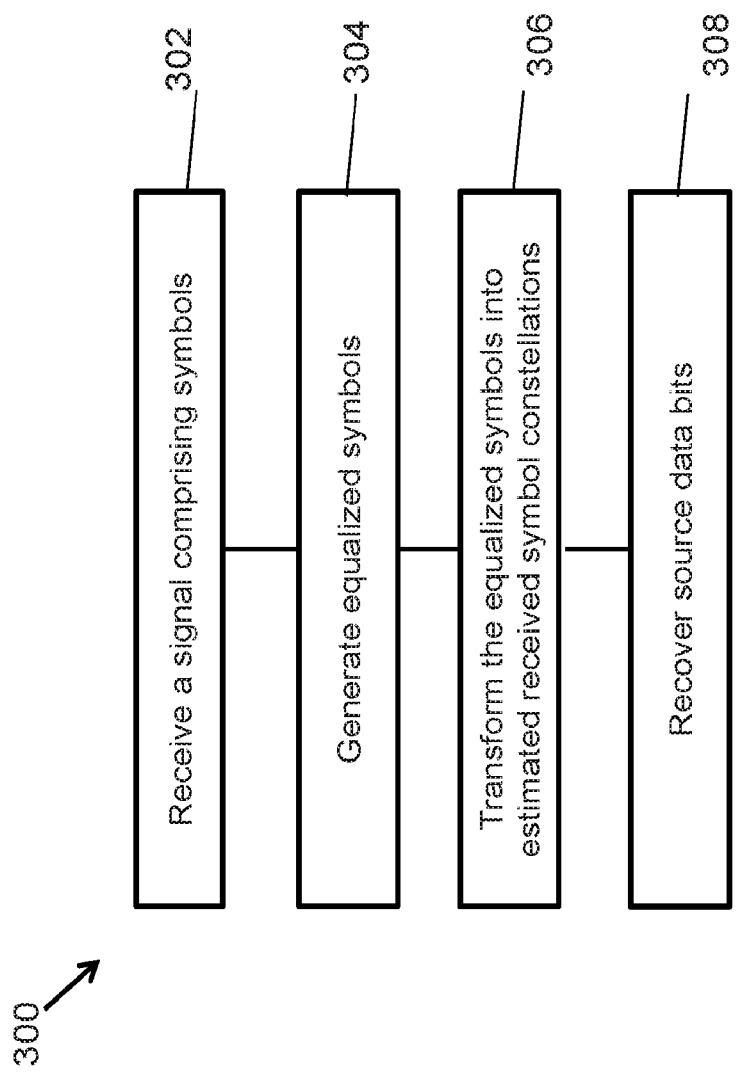
FIG. 3 shows a flowchart of a wireless communication reception method.

FIG. 3 is a flowchart of a wireless communications method 300. The method 300 may be implemented by a wireless communications receiver apparatus such as a base station or a UE.

The method 300 includes, at 302, receiving a signal comprising a logical grouping of Nd symbols arranged in a time-frequency grid.

The method 300 includes, at 304, generating equalized symbols by equalizing the signal by estimating a channel over which the signal is received.

The method 300 includes, at 306, transforming the equalized symbols using an invertible transform into Nd estimated received symbol constellations.

The method 300 includes, at 308, recovering source data bits from the Nd estimated received symbol constellations. Various other features of the method 300 are described with respect to the transmission side method 200 and further described with reference to FIGS. 4 to 16.

A. Example Embodiments of Dispersed OTFS Modulated Signals

Orthogonal Time Frequency and Space (OTFS), further described in the present document, is a technique for generating waveforms which can extract the diversity of a wireless channel and achieve its capacity.

Figure 4:
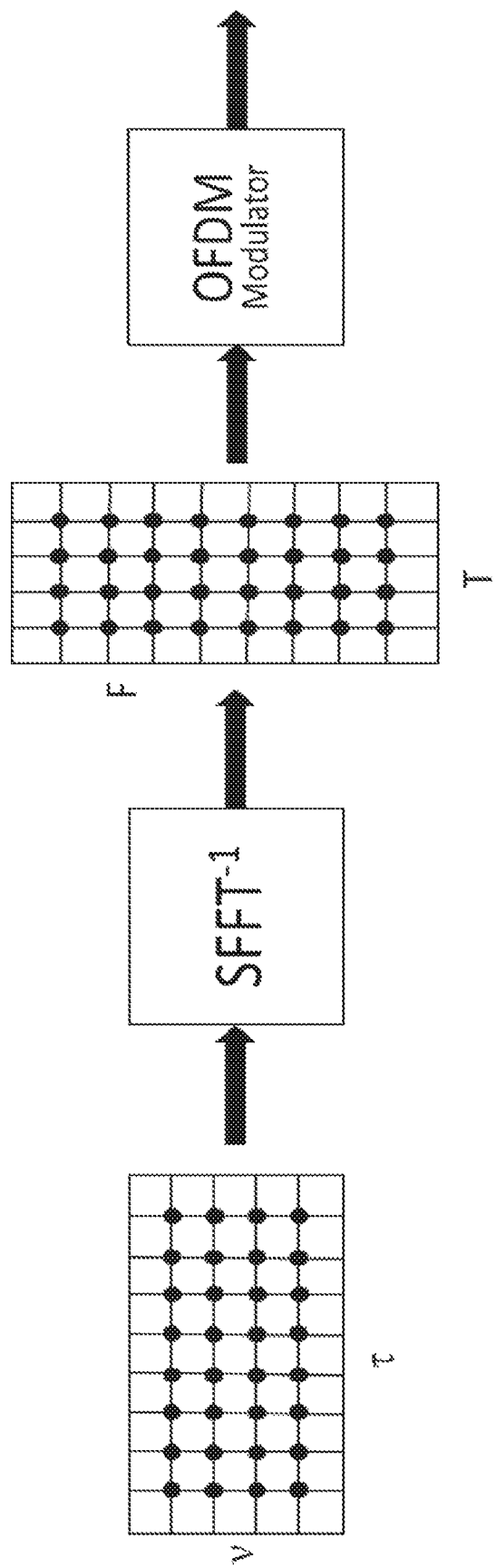
FIG. 4 shows OTFS waveform generation example. A grid of 4×8 QAM symbols in the delay-Doppler domain is converted Inverse Symplectic Fourier transform (SFFT$^{-1}$) to the Time(T)-Frequency(F) domain and used as an input to an OFDM modulator.

In some embodiments, encoded bits are mapped to constellation symbols (such as QAM symbols), which are assigned to a rectangular grid corresponding to a delay- Doppler domain (see FIG. 4). This grid is transformed to an equivalent Time-Frequency grid with an Inverse Symplectic Fourier transform. This Time-Frequency grid may be used as an input to a standard OFDM modulator to transmit the waveform signal over a wireless channel. The Time-Frequency grid depicted in FIG. 4 may represent only a portion of a larger Time-Frequency grid, corresponding to a specific user's data. Delay-Doppler domain are represented by $\tau$ and $v$ variables, and time-frequency are denoted by T and F axis in FIGS. 4 to 16.

The transfer function of the wireless channel is typically unknown and in the presence of moving reflectors (Doppler) is also changing in time. The receiver estimates the channel and then equalize the received signal before decoding it. A common method uses known Reference Signals (RS), which are added to the information-bearing transmitted signal. The receiver uses these RS to estimate the channel and then equalize the information-bearing signal with this channel estimation. These methods are both related to single and multiple antenna systems (SISO/MIMO).

The design of the RS is generally known to one of skill in the art. Some embodiments may use signals (also referred to as pilots) that are designed in the delay-Doppler domain or in the Time-Frequency domain. The RS may or may not be orthogonal to the information-bearing signal.

FIG. 4 shows an OTFS waveform generation example. A grid of 4×8 QAM symbols in the delay($\tau$)-Doppler($v$) domain is converted using the Inverse Symplectic Fourier transform (SFFT$^{-1}$) to the Time(T)-Frequency(F) domain and used as an input to an OFDM modulator.

B. Multiplexing OTFS Data and RS

This section describes, among other things, embodiments for multiplexing orthogonal RS with OTFS data. In some embodiments, specific locations on the Time-Frequency grid are assigned to RS (typically in a density that will allow a sufficient quality of channel estimation). The other locations of that grid are assigned to data symbols, which originate from transformed delay-Doppler grid(s) that are mapped to these locations. The size of the delay-Doppler grid(s) matches the size of the data symbols.

Figure 5:
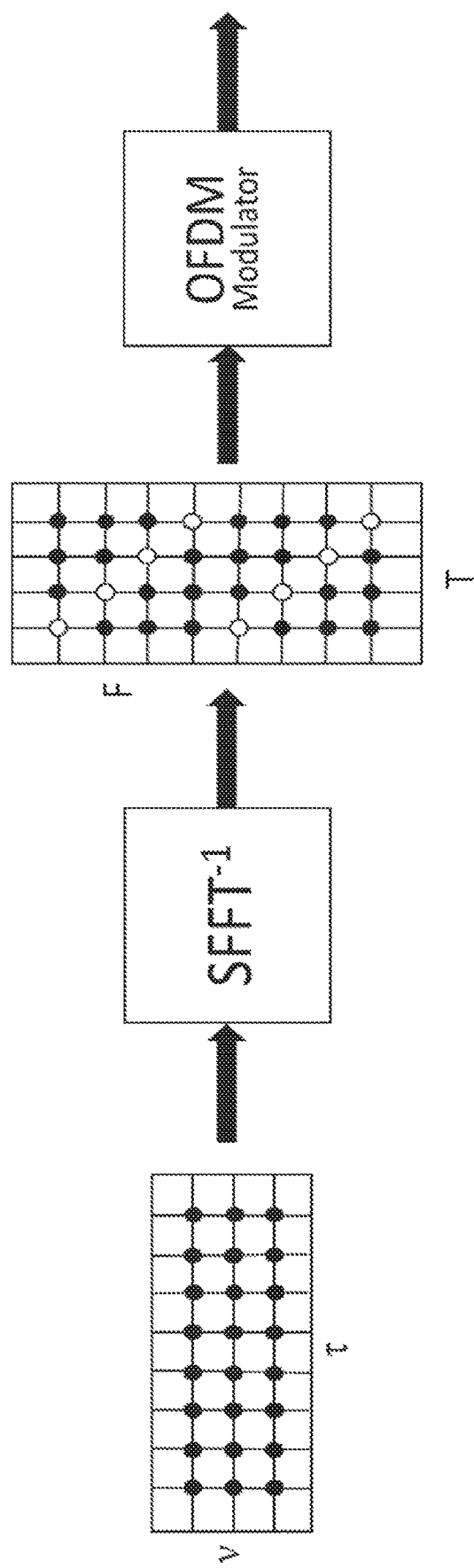
FIG. 5 shows Time Frequency example of multiplexing RS (white circles) and data (black circles).

FIG. 5 illustrates an example of such multiplexing, where each row (slice along time) contains one RS and three data symbols. Data symbols, arranged as matrix $s_{3\times 8}$ (Table 1) in the delay-Doppler domain are transformed to matrix $S_{8\times 3}$ (Table 2) in the Time-Frequency domain. These symbols are multiplexed with RS signals, as shown in Table 3 and used as an input to an OFDM modulator

TABLE 1

Symbol mapping example in the delay-Doppler domain

| s(1, 1) | s(1, 2) | s(1, 3) | s(1, 4) | s(1, 5) | s(1, 6) | s(1, 7) | s(1, 8) |
|---|---|---|---|---|---|---|---|
| s(2, 1) | s(2, 2) | s(2, 3) | s(2, 4) | s(2, 5) | s(2, 6) | s(2, 7) | s(2, 8) |
| s(3, 1) | s(3, 2) | s(3, 3) | s(3, 4) | s(3, 5) | s(3, 6) | s(3, 7) | s(3, 8) |

Table 2 shows Symbols mapping example in the Time-Frequency domain.

| S(1, 1) | S(1, 2) | S(1, 3) |
|---|---|---|
| S(2, 1) | S(2, 2) | S(2, 3) |
| S(3, 1) | S(3, 2) | S(3, 3) |
| S(4, 1) | S(4, 2) | S(4, 3) |
| S(5, 1) | S(5, 2) | S(5, 3) |
| S(6, 1) | S(6, 2) | S(6, 3) |
| S(7, 1) | S(7, 2) | S(7, 3) |
| S(8, 1) | S(8, 2) | S(8, 3) |

Table 3 shows Time-Frequency multiplexing example of data and RS.

| RS | S(1, 1) | S(1, 2) | S(1, 3) |
|---|---|---|---|
| S(2, 1) | RS | S(2, 2) | S(2, 3) |
| S(3, 1) | S(3, 2) | RS | S(3, 3) |
| S(4, 1) | S(4, 2) | S(4, 3) | RS |
| RS | S(5, 1) | S(5, 2) | S(5, 3) |
| S(6, 1) | RS | S(6, 2) | S(6, 3) |
| S(7, 1) | S(7, 2) | RS | S(7, 3) |
| S(8, 1) | S(8, 2) | S(8, 3) | RS |

Figure 6:
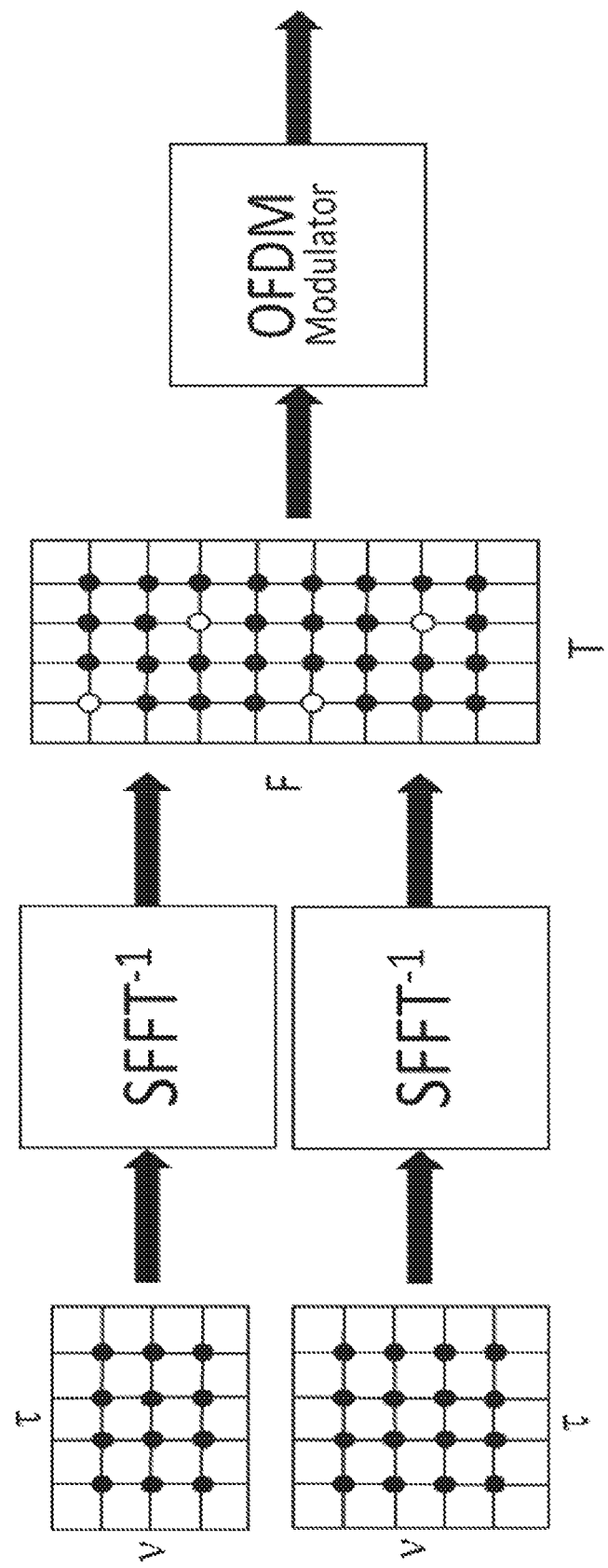
FIG. 6 shows multiple delay-Doppler grid examples.

Different multiplexing schemes between RS and data may require more than one grid in the delay-Doppler domain, as illustrated in the example of FIG. 6. The Time-Frequency data symbols consist of two orthogonal grids, one of size 4×3 (which has RS in its rows) and one of size 4×4 (which does not have any RS). Data symbols, arranged as two matrices $s_{3\times 4}$ and $z_{4\times 4}$ (Table 4) in the delay-Doppler domain are transformed to two matrices $S_{4\times 3}$ and $Z_{4\times 4}$ (Table 5) in the Time-Frequency domain. These symbols are multiplexed with RS signals, as shown in Table 6 and used as an input to an OFDM modulator.

Table 4A shows a first example of the 3×4 s-matrix.

| s(1, 1) | s(1, 2) | s(1, 3) | s(1, 4) |
|---|---|---|---|
| s(2, 1) | s(2, 2) | s(2, 3) | s(2, 4) |
| s(3, 1) | s(3, 2) | s(3, 3) | s(3, 4) |

Table 4B shows an example of the 4×4 z-matrix.

| z(1, 1) | z(1, 2) | z(1, 3) | z(1, 4) |
|---|---|---|---|
| z(2, 1) | z(2, 2) | z(2, 3) | z(2, 4) |
| z(3, 1) | z(3, 2) | z(3, 3) | z(3, 4) |
| z(4, 1) | z(4, 2) | z(4, 3) | z(4, 4) |

Table 5A shows a 4×3 example of the s-matrix.

| S(1, 1) | S(1, 2) | S(1, 3) |
|---|---|---|
| S(2, 1) | S(2, 2) | S(2, 3) |
| S(3, 1) | S(3, 2) | S(3, 3) |
| S(4, 1) | S(4, 2) | S(4, 3) |

Table 5B shows a 4×4 example of the z-matrix.

| Z(1, 1) | Z(1, 2) | Z(1, 3) | Z(1, 3) |
|---------|---------|---------|---------|
| Z(2, 1) | Z(2, 2) | Z(2, 3) | Z(2, 3) |
| Z(3, 1) | Z(3, 2) | Z(3, 3) | Z(3, 3) |
| Z(4, 1) | Z(4, 2) | Z(4, 3) | Z(4, 3) |

Table 6 shows an example of time-frequency multiplexing of data and RS for multiple grids.

| RS | S(1, 1) | S(1, 2) | S(1, 3) |
|---|---|---|---|
| Z(1, 1) | Z(1, 2) | Z(1, 3) | Z(1, 4) |
| S(2, 1) | S(2, 2) | RS | S(2, 3) |
| Z(2, 1) | Z(2, 2) | Z(2, 3) | Z(2, 4) |
| RS | S(3, 1) | S(3, 2) | S(3, 3) |
| Z(3, 1) | Z(3, 2) | Z(3, 3) | Z(3, 4) |
| S(4, 1) | S(4, 2) | RS | S(4, 3) |
| Z(4, 1) | Z(4, 2) | Z(4, 3) | Z(4, 4) |

Figure 7:
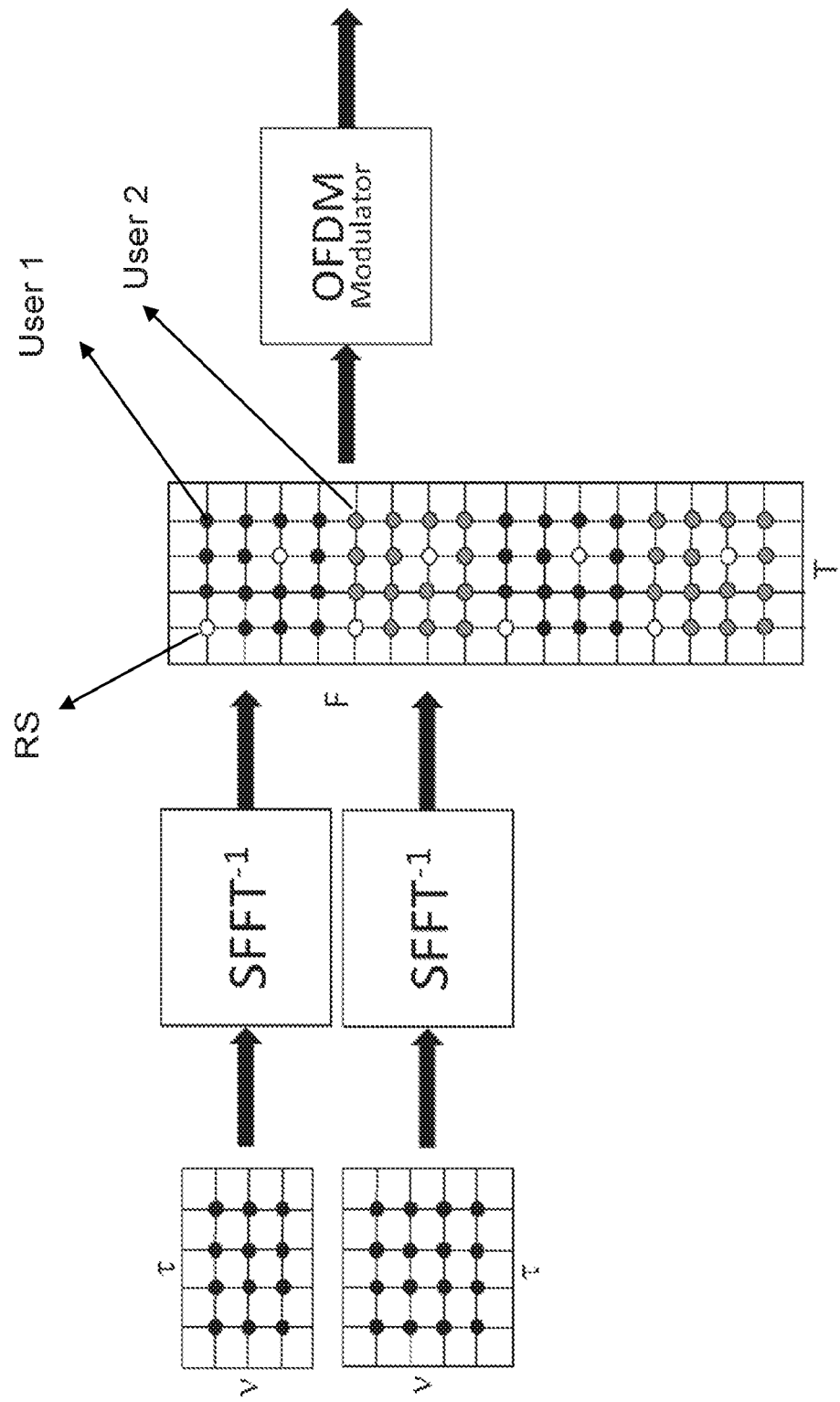
FIG. 7 shows multiple delay-Doppler grid examples. Reference Signals are represented in hollow circles and data are in shaded signals.

In some embodiments, the mapping to Time-Frequency resource does not have to be continuous in either dimension. As an example, to support user multiplexing along frequency, the selected resources for data symbols may not be continuous. FIG. 7 shows an example of such mapping, where data symbols of two users (black and grey circles for user 1 and user 2) are multiplexed in the Time-Frequency grid FIG. 7 shows Multiple delay-Doppler grids and multiple users example. RS are represented with white circles and data for two different users with black circles and grey circles (user 1, user 2).

Figure 8:
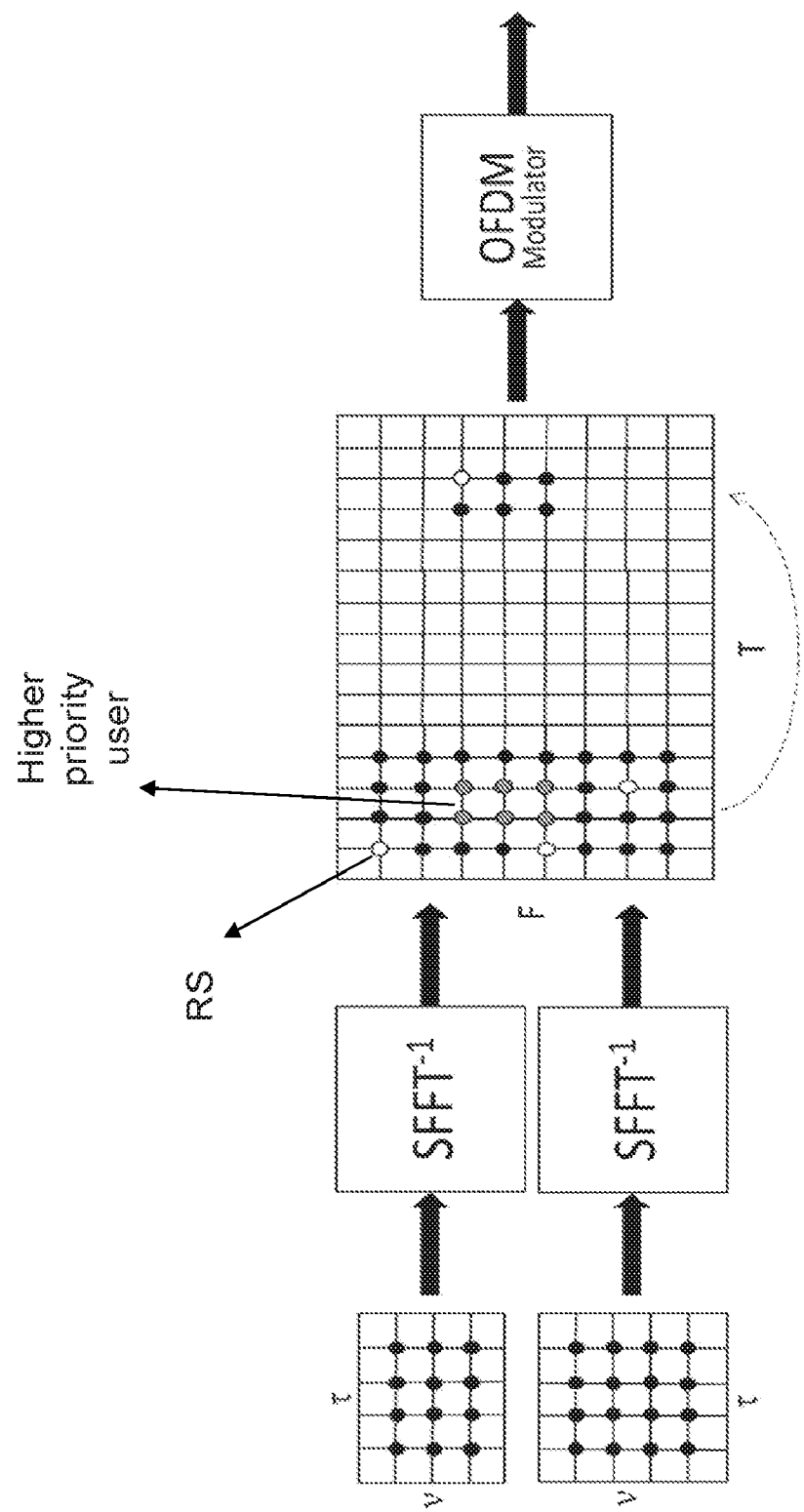
FIG. 8 shows non-grid allocation along timing. In this example, different time-frequency grid elements are transmitted at different times. This type of allocation may be used for postponing some of the use device's time-frequency elements to a later transmission in case a higher priority user device is using the resources.

FIG. 8 shows an example of non-continuous mapping along time. FIG. 8 shows Non-continuous grid allocation along time. In this example, different Time-Frequency grid elements are transmitted at different times. This type of allocation may be used for postponing some of the user's Time-Frequency elements to a later transmission in case a higher priority user (grey circles) is using these resources.

Figure 9:
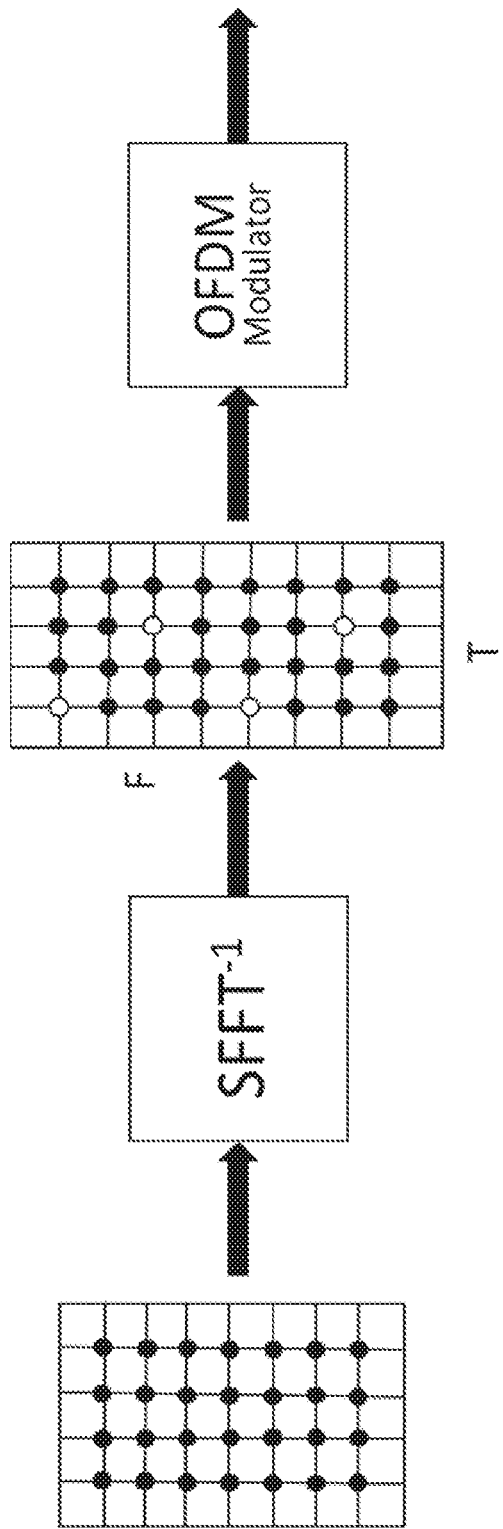
FIG. 9 shows combined delay Doppler grid examples.

In the example of FIG. 9 it is also possible to combine the two separated grids into a single 7×4 grid, as shown in FIG. 9. However, this grid is no longer directly related to the physical dimensions of delay and Doppler.

Figure 10:
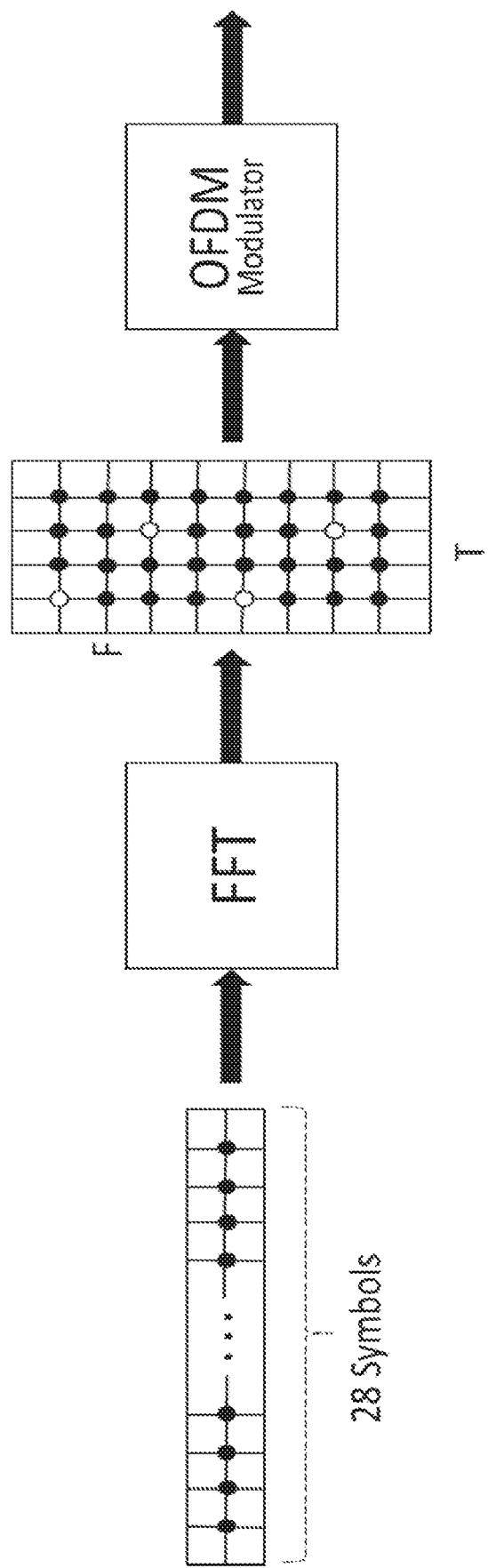
FIG. 10 shows a multiplexing example for a 1-D transform.

Without losing diversity, it is also possible to arrange the data symbols as a single dimension vector that does not correspond directly to the delay-Doppler domain. A Fourier transform (FFT) may be applied to these symbols before they are mapped to data resources in the Time-Frequency domain. Similarly, to the example of FIG. 9, it is possible to generate all the Time-Frequency data symbols, using a single dimension FFT operating on a vector of 28 QAM symbols, as shown in FIG. 10. Denoting the data symbols vector after the FFT as S, Table 7 shows an example for mapping data symbols and RS. However, any other mapping may also be applied.

TABLE 7

| RS | S(1) | S(2) | S(3) |
|---|---|---|---|
| S(4) | S(5) | S(6) | S(7) |
| S(8) | S(9) | RS | S(10) |
| S(11) | S(12) | S(13) | S(14) |
| RS | S(15) | S(16) | S(17) |
| S(18) | S(19) | S(20) | S(21) |
| S(22) | S(23) | RS | S(24) |
| S(25) | S(26) | S(27) | S(28) |

C. Example Receiver Structure for Dispersed OTFS

A receiver for Dispersed OTFS may include a channel estimation module, an Equalizer, domain transformations and a decoder.

Figure 11:
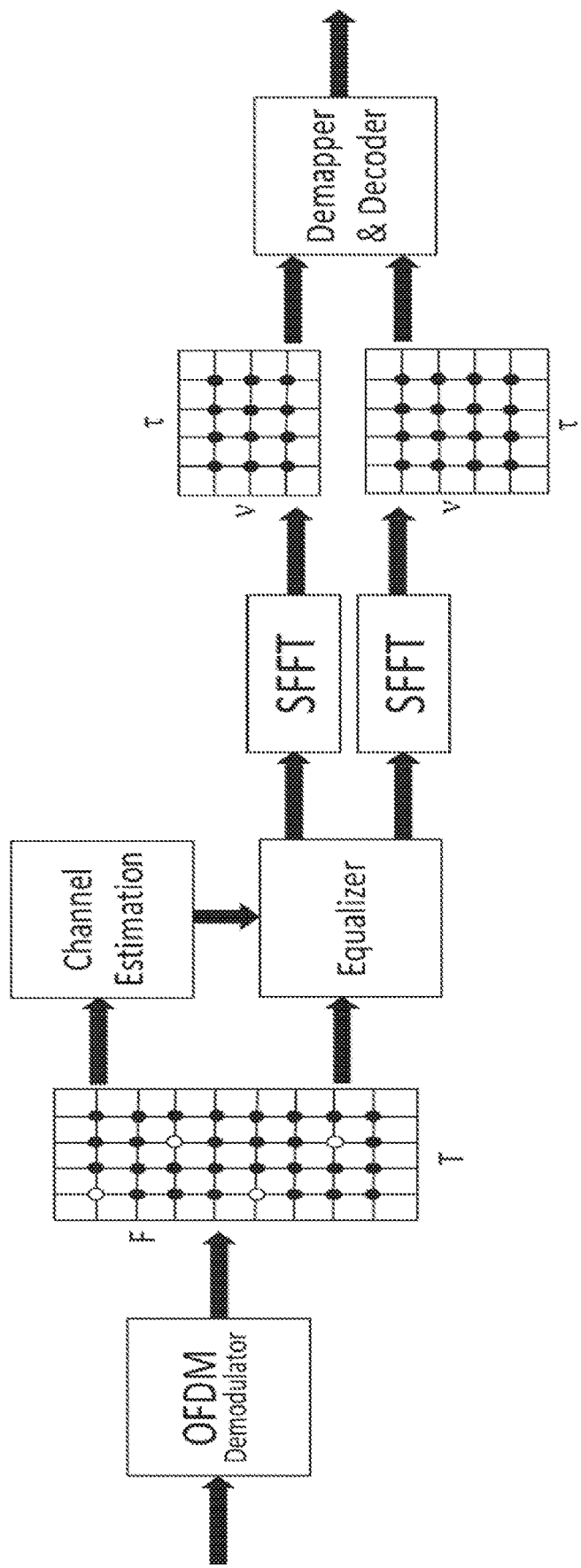
FIG. 11 shows a receiver implementation example with a linear equalizer and two grids.
Figure 12:
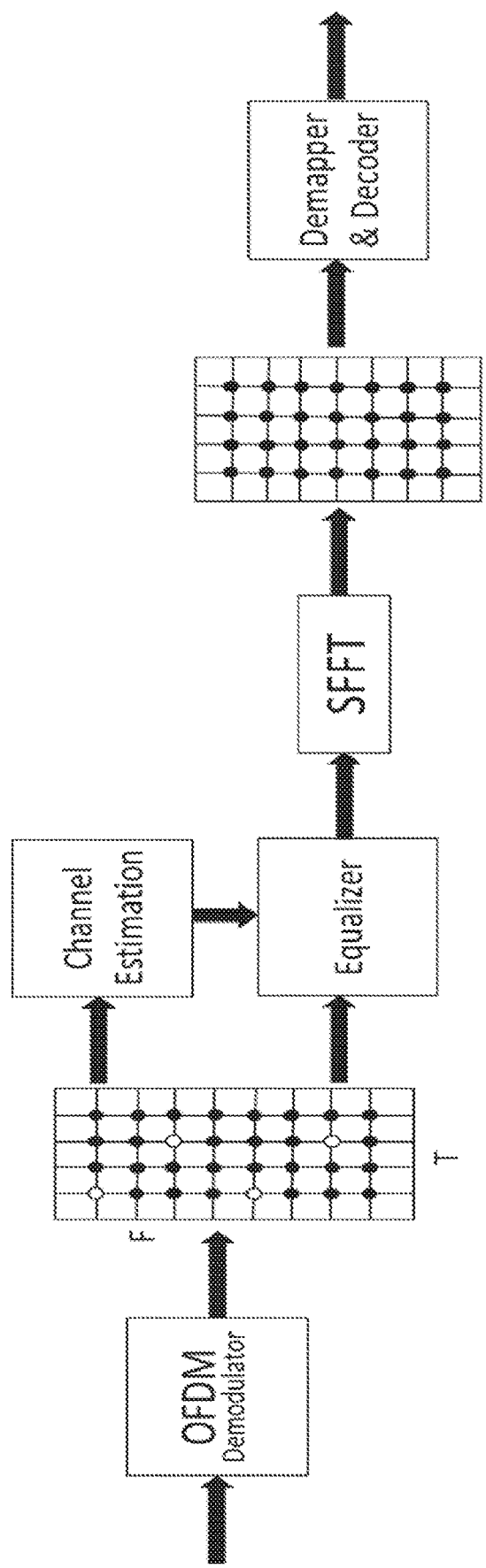
FIG. 12 shows receiver implementation examples with a linear equalizer and a single grid.

Example implementations of such a receiver, are shown in FIG. 11 and FIG. 12, and consist of a linear equalizer, which may implement a Minimum Mean Square Error (MIME) function. After OFDM demodulation, the RS are extracted from the Time-Frequency grid and used for estimating the channel. Then, data symbols are extracted from the Time-Frequency grid and equalized using this channel estimation. The Symplectic Fourier transform (SFFT) is applied to one or more grids and the transformed symbols are demapped and decoded. For the case of FIG. 12, the grid is no longer related directly to the physical dimensions of delay and Doppler.

In particular, FIG. 11 shows a receiver implementation example with a linear equalizer and two grids.

FIG. 12 shows a receiver implementation example with a linear equalizer and a single grid.

Figure 13:
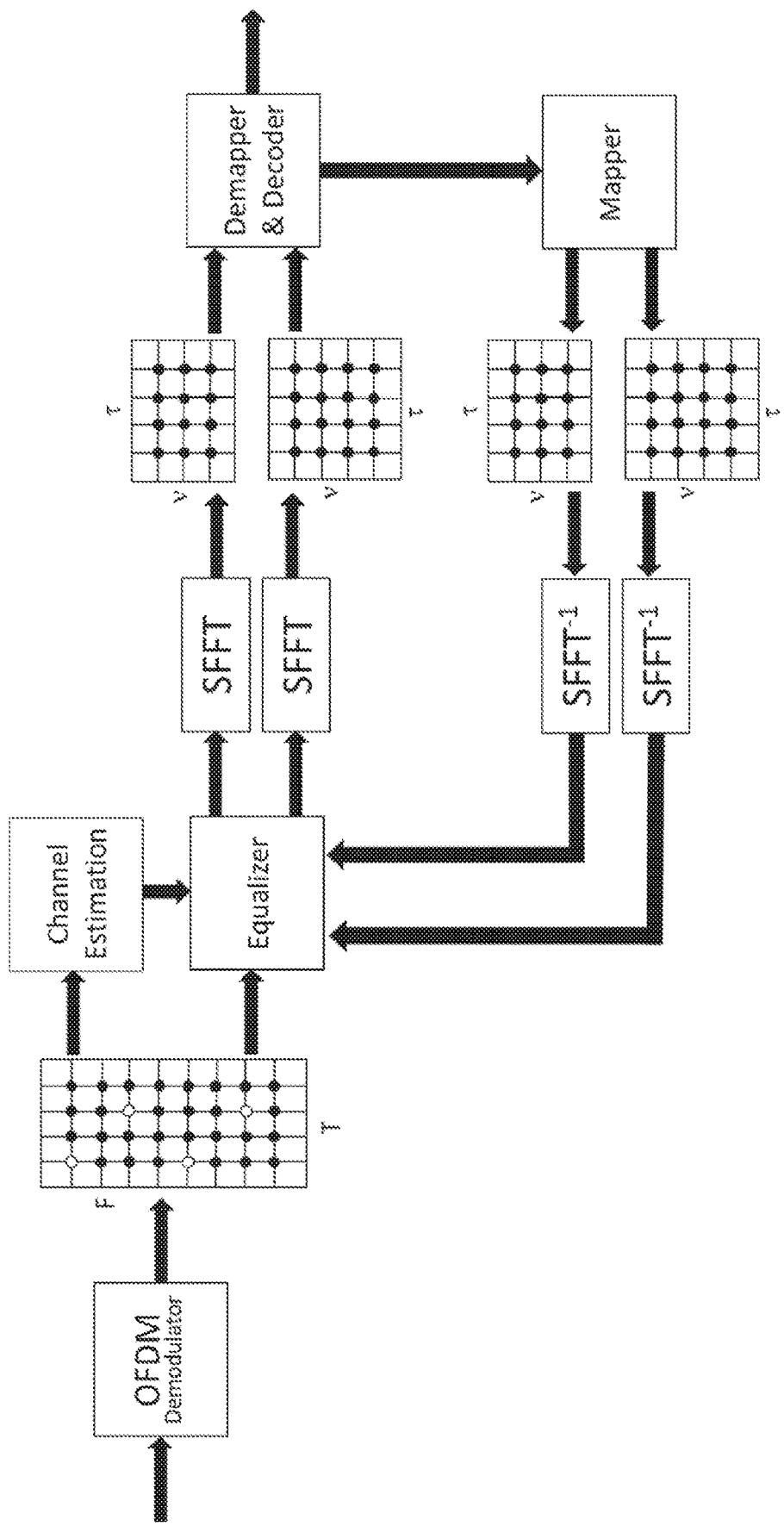
FIG. 13 shows an example of an iterative receiver implementation with multiple grids.
Figure 14:
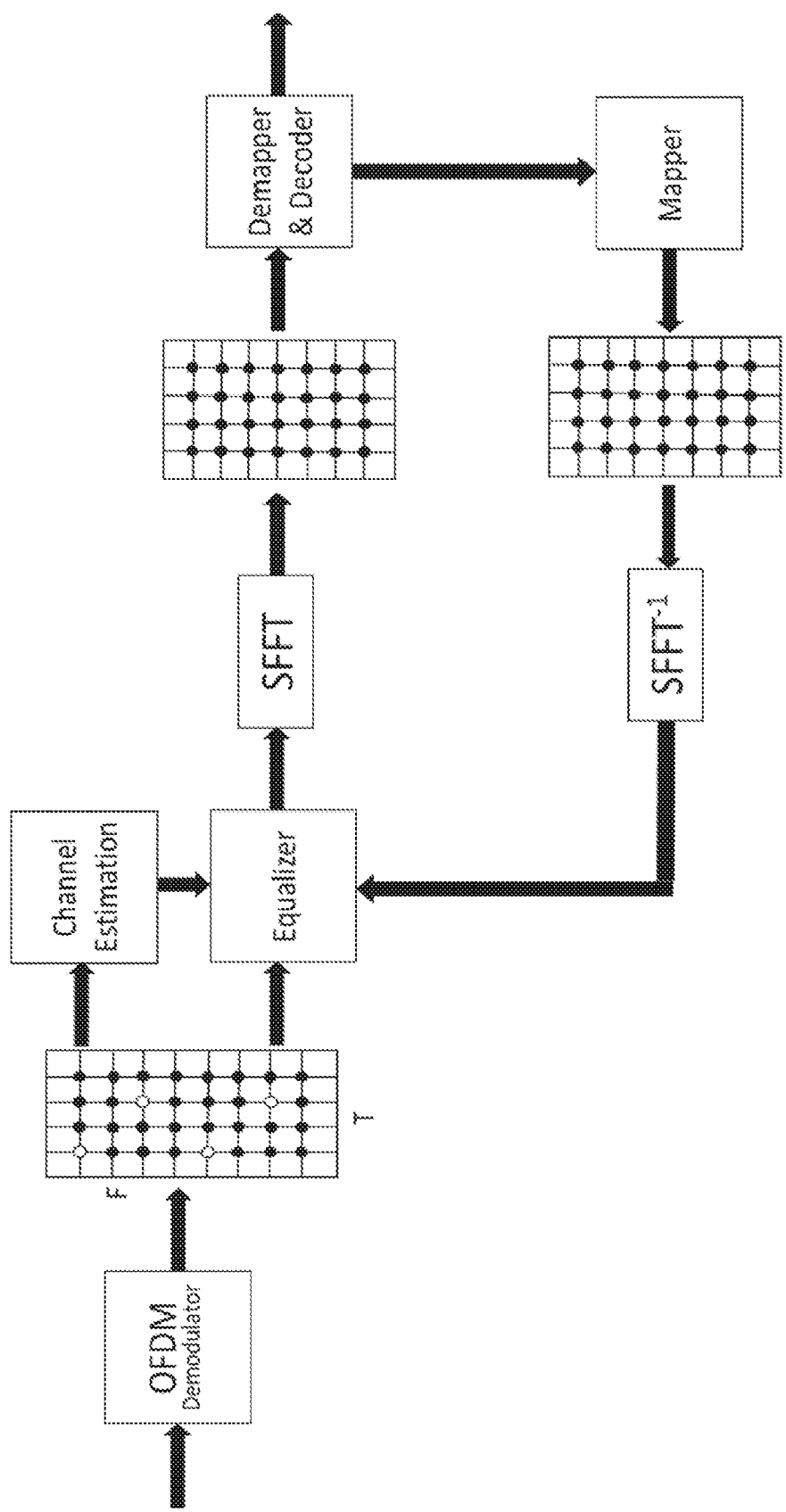
FIG. 14 shows an iterative receiver implementation example with a single grid.

Some implementations may include an iterative receiver, further described herein, as shown in FIG. 13 and FIG. 14. In these implementations, the equalizer also uses a priori information from the decoder. The Demapper generates extrinsic information to the decoder and the Mapper generates extrinsic information to the equalizer. Both inverse and non-inverse Symplectic transforms are used for domain conversion. For the case of FIG. 14, the grid is no longer related directly to the physical dimensions of delay and Doppler.

In particular, FIG. 13 shows an iterative receiver implementation example with multiple grids. From left to right, an OFDM demodulator receives signal. A channel estimation stage is used for estimating the channel (time-frequency or delay-Doppler). An equalizer is used to equalize the channel impairments based on the estimated channel from channel estimation. The equalizer may use feedback from decoded signals that are transformed back to delay-Doppler domain. The output of equalizer is transformed using SFFT into delay Doppler domain, and then the output is demapped and decoded to obtain bit estimates.

FIG. 14 Iterative receiver implementation example with a single grid, that follows a signal processing flow similar to as described with respect to FIG. 13.

Figure 15:
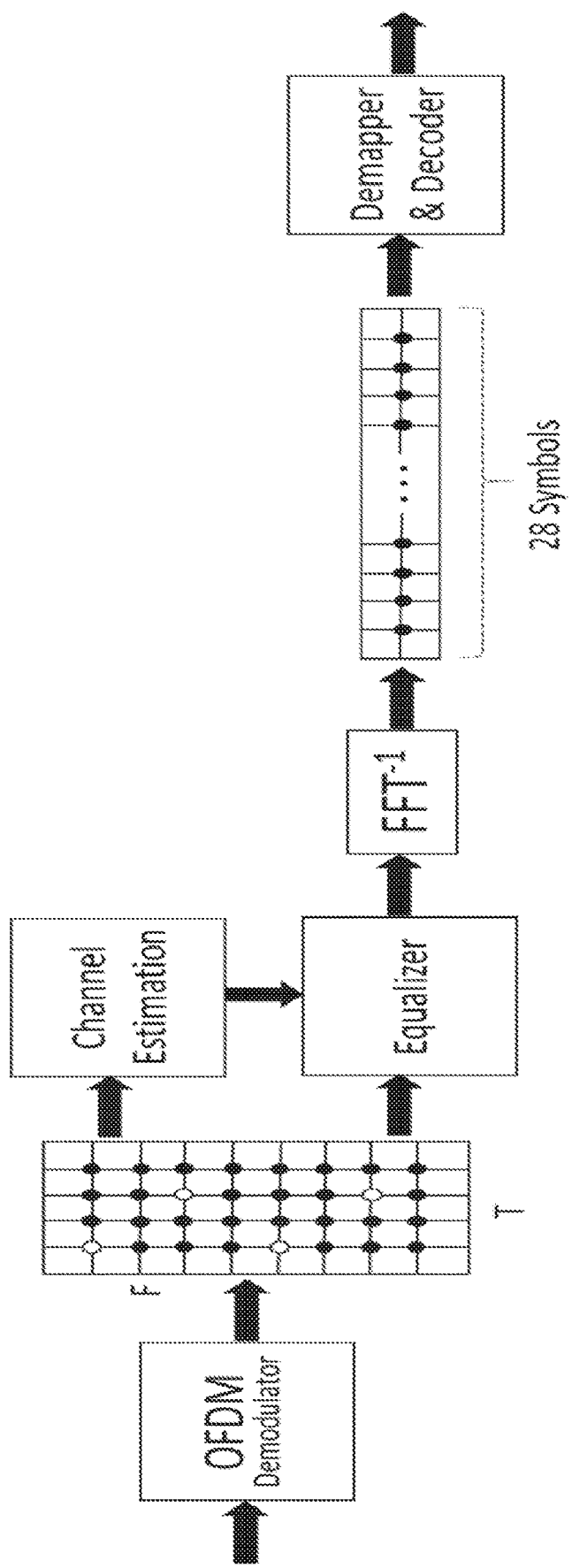
FIG. 15 shows a receiver implementation example with a 1-D transform.
Figure 16:
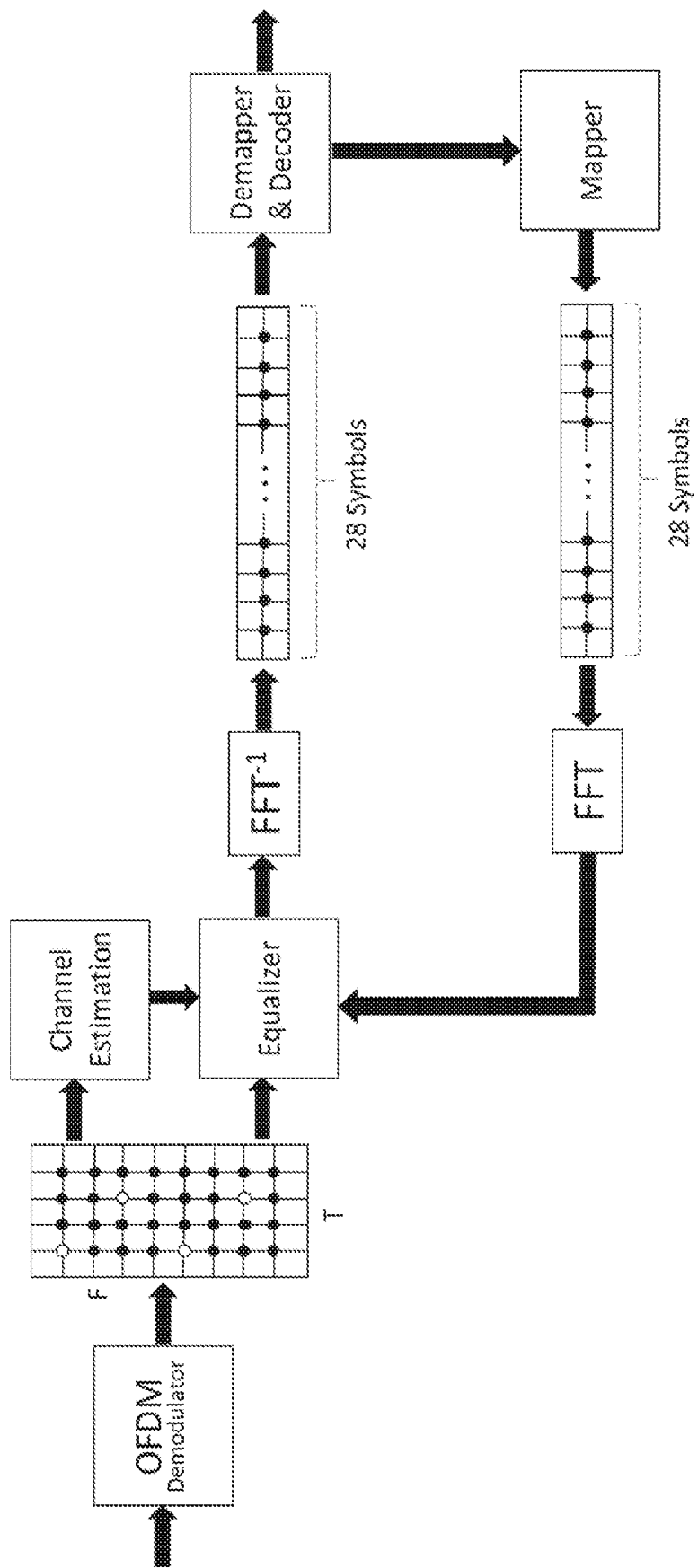
FIG. 16 shows an iterative receiver implementation example with a 1-D transform.

In some embodiments, the 2-D Symplectic Fourier transform may be replaced by a 1-D Fourier transform, as shown in FIG. 15 and FIG. 16 for the non-iterative and iterative receiver implementations.

Some features as described with respect to FIGS. 1 to 16 are:
  Arrange $N_d$ encoded constellation symbols (such as QAM symbols) in an M-dimensional grid of size $n_1 \times n_2 \times \ldots \times n_M$, where M is an integer (M≥1) and the dimensions $n_i$ (i=1, 2, ..., M) are any positive integers that satisfy $N_d = \Pi_{i=1}^M n_i$. Transform this grid with an inversible transform, $\mathbb{T}$, and map the $N_d$ transformed elements to $N_d$ different elements in a Time-Frequency grid.
  The Time-Frequency grid may be a full grid or a partial grid, a continuous or a non-continuous grid.
  Mapping to Time-Frequency elements does not have to be continuous in either dimension.
  Other elements in Time-Frequency grid may be used for reference signals or other data.
  The inversible transform may spread each symbol across all the elements of the transformed grid.

The inversible transform may be any form of a single or multi-dimensional Fourier transform (standard, inverse, Symplectic, etc.). These type of transforms, convert a multiplicative channel in the Time-Frequency domain to a convolution channel in the other domain and extract the maximum diversity for each symbol.

The inversible transform may be a permutation transform. Some such embodiments may correspond to interleaved-OFDM.

The encoded constellation symbols may be derived from Multi-Layer-Coding (MLC), where different constellation bits in each symbol are encoded separately.

The encoded constellation symbols may be constructed from interleaved coded bits.

D. Example Variants of Receiver Embodiments

An example embodiment may extract $N_d$ different elements from a Time-Frequency grid and equalize them, using a channel estimation that may be derived from reference signals in that Time-Frequency grid. Arrange the equalized symbols in an M-dimensional grid of size $n_1 \times n_2 \times \ldots \times n_M$, where M is an integer (M≥1) and the dimensions $n_i$ (i=1, 2, ..., M) are any positive integers that satisfy $N_d = \Pi_{i=1}^{M} n_i$. Embodiments may then transform this grid with the inverse of the transmitter's transform, $\mathbb{T}^{-1}$, to obtain $N_d$ received constellation symbols. This may be followed by a conversion of the received constellation symbols to bit metrics and use them for decoding and estimating of the source data bits.

Some embodiments may perform splitting into several grids, as described in this document.

E. Example Embodiments of an Iterative Receiver

An iterative receiver, performs several iterations of the following steps: Extract $N_d$ different elements from a Time-Frequency grid and equalize them, using a channel estimation that may be derived from reference signals in that Time-Frequency grid, and a priori information on these $N_d$ elements. Arrange the equalized symbols in an M-dimensional grid of size $n_1 \times n_2 \times \ldots \times n_M$, where M is an integer (M≥1) and the dimensions $n_i$ (i=1, 2, ..., M) are any positive integers that satisfy $N_d = \Pi_{i=1}^{M} n_i$. Transform this grid with the inverse of the transmitter's transform, $\mathbb{T}^{-1}$, to obtain $N_d$ received constellation symbols. Compute from the received constellation symbols, extrinsic bit metrics and use them for decoding and estimating the source data bits. Generate estimations on coded bits and use them to compute for each one of the $N_d$ constellation symbols a mean and a variance. Arrange each one of these metrics in an M-dimensional grid of size $n_1 \times n_2 \times \ldots \times n_M$ and transform them with the transform $\mathbb{T}$. Use these transformed metrics as a priori information for the equalizer.

Some embodiments may perform splitting into several grids.

The extrinsic bit metrics, generated for each received constellation symbol may be decoded separately in correspondence with the transmitter's Multi-Layer-Coding (MLC) scheme.

Some embodiments may perform layer by layer iterative decoding.

The extrinsic bit metrics may be deinterleaved before decoding. The coded bits estimations may be interleaved after decoding.

The transform of the variance metric may be replaced by an averaging operation.

F. Brief Description of OTFS

This section provides some examples of the mathematical framework on which OTFS technology is based. OTFS is a modulation technique that modulates each information (e.g., QAM) symbol onto one of a set of two dimensional (2D) orthogonal basis functions that span the bandwidth and time duration of the transmission burst or packet. The modulation basis function set is specifically derived to best represent the dynamics of the time varying multipath channel.

OTFS transforms the time-varying multipath channel into a time invariant delay-Doppler two-dimensional convolution channel. In this way, it eliminates the difficulties in tracking time-varying fading, for example in high speed vehicle communications.

OTFS increases the coherence time of the channel by orders of magnitude. It simplifies signaling over the channel using well studied AWGN codes over the average channel SNR. More importantly, it enables linear scaling of throughput with the number of antennas in moving vehicle applications due to the inherently accurate and efficient estimation of channel state information (CSI). In addition, since the delay-doppler channel representation is very compact, OTFS enables massive MIMO and beamforming with CSI at the transmitter for four, eight, and more antennas in moving vehicle applications. The CSI information needed in OTFS is a fraction of what is needed to track a time varying channel.

Orthogonal Time Frequency Space (OTFS) modulation is comprised of a cascade of two transformations. The first transformation maps the two-dimensional plane where the information symbols reside (and which we call the delay-Doppler plane) to the time frequency plane. The second one transforms the time frequency domain to the waveform time domain where actual transmitted signal is constructed. This transform can be thought of as a generalization of multicarrier modulation schemes.

G. The Wireless Channel, as Rep Resented for OTFS Discussion

The multipath fading channel is commonly modeled in the baseband as a convolution channel with a time varying impulse response $$r(t) = \int h(\tau,t) s(t-\tau) d\tau \quad (1)$$

where s(t) and r(t) represent the complex baseband channel input and output respectively and where $h(\tau, t)$ is the complex baseband time varying channel response.

This representation, while general, does not give us insight into the behavior and variations of the time varying impulse response. A more useful and insightful model, which is also commonly used for Doppler multipath doubly fading channels is $$r(t) = \iint h(\tau,v) e^{j2\pi v(t-\tau)} s(t-\tau) dv d\tau \quad (2)$$

In this representation, the received signal is a superposition of reflected copies of the transmitted signal, where each copy is delayed by the path delay $\tau$, frequency shifted by the Doppler shift $v$ and weighted by the time-invariant delay-Doppler impulse response $h(\tau, v)$ for that $\tau$ and $v$. In addition to the intuitive nature of this representation, Eq. (2) maintains the generality of Eq. (1). In other words it can represent complex Doppler trajectories, like accelerating vehicles, reflectors etc. This can be seen if we express the time varying impulse response as a Fourier expansion with respect to the time variable t $$\hat{h}(\tau,t) = \int h(\tau,v)e^{j2\pi vt}dt \quad (3)$$

Substituting (3) in (1) we obtain Eq. (2) after some manipulation.

An important feature revealed by these two figures is how compact the $(\tau, v)$ representation is compared to the $(\tau, t)$ representation. This has important implications for channel estimation, equalization and tracking as will be discussed later.

Notice that while $h(\tau, v)$ is, in fact, time-invariant, the operation on $s(t)$ is still time varying, as can be seen by the effect of the explicit complex exponential function of time in Eq. (2). The technical efforts in this paper are focused on developing a modulation scheme based on appropriate choice of orthogonal basis functions that render the effects of this channel truly time-invariant in the domain defined by those basis functions. Let us motivate those efforts with a high level outline of the structure of the proposed scheme here.

Let us consider a set of orthonormal basis functions $\phi_{\tau,v}(t)$ indexed by $\tau, v$ which are orthogonal to translation and modulation, i.e., $$\phi_{\tau,v}(t-\tau_0) = \phi_{\tau+\tau_0,v}(t)$$

$$e^{j2\pi v_0 t}\phi_{\tau,v}(t) = \phi_{\tau,v-v_0}(t) \quad (4)$$

and let us consider the transmitted signal as a superposition of these basis functions $$s(t) = \iint x(\tau,v)\phi_{\tau,v}(t)d\tau dv \quad (5)$$

where the weights $x(\tau, v)$ represent the information bearing signal to be transmitted. After the transmitted signal of (5) goes through the time varying channel of Eq. (2) we obtain a superposition of delayed and modulated versions of the basis functions, which due to (4) results in $$r(t) = \iint h(\tau,v)e^{j2\pi v(t-\tau)}s(t-\tau)dvd\tau \quad (6)$$

$$= \iint \phi_{\tau,v}(t)\{h(\tau,v) * x(\tau,v)\}d\tau dv$$

where * denotes two dimensional convolution. Eq. (6) can be thought of as a generalization of the derivation of the convolution relationship for linear time invariant systems, using one dimensional exponentials as basis functions. Notice that the term in brackets can be recovered at the receiver by matched filtering against each basis function $\phi_{\tau,v}(t)$. In this way a two dimensional channel relationship is established in the $(\tau, v)$ domain $y(\tau, v) = h(\tau, v) * x(\tau, v)$, where $y(\tau, v)$ is the receiver two dimensional matched filter output. Notice also, that in this domain the channel is described by a time invariant two-dimensional convolution.

A final different interpretation of the wireless channel will also be useful in what follows. Let us consider $s(t)$ and $r(t)$ as elements of the Hilbert space of square integrable functions $\mathcal{H}$. Then Eq. (2) can be interpreted as a linear operator on $\mathcal{H}$ acting on the input $s(t)$, parametrized by the impulse response $h(\tau, v)$, and producing the output $r(t)$ $$r = \Pi_h(s) : s(t) \in \mathcal{H} \xrightarrow{\Pi_h(\cdot)} r(t) \in \mathcal{H} \quad (7)$$

Notice that although the operator is linear, it is not time-invariant. In the no Doppler case, i.e., if $h(v, \tau) = h(0, \tau)\delta(v)$, then Eq. (2) reduces to a time invariant convolution. Also notice that while for time invariant systems the impulse response is parameterized by one dimension, in the time varying case we have a two dimensional impulse response. While in the time invariant case the convolution operator produces a superposition of delays of the input $s(t)$, (hence the parameterization is along the one dimensional delay axis) in the time varying case we have a superposition of delay-and-modulate operations as seen in Eq. (2) (hence the parameterization is along the two dimensional delay and Doppler axes). This is a major difference which makes the time varying representation non-commutative (in contrast to the convolution operation which is commutative), and complicates the treatment of time varying systems.

The important point of Eq. (7) is that the operator $\Pi_h(\cdot)$ can be compactly parametrized in a two dimensional space $h(\tau, v)$, providing an efficient, time invariant description of the channel. Typical channel delay spreads and Doppler spreads are a very small fraction of the symbol duration and subcarrier spacing of multicarrier systems.

In the mathematics literature, the representation of time varying systems of (2) and (7) is called the Heisenberg representation. It can actually be shown that every linear operator (7) can be parameterized by some impulse response as in (2).

Figure 17:
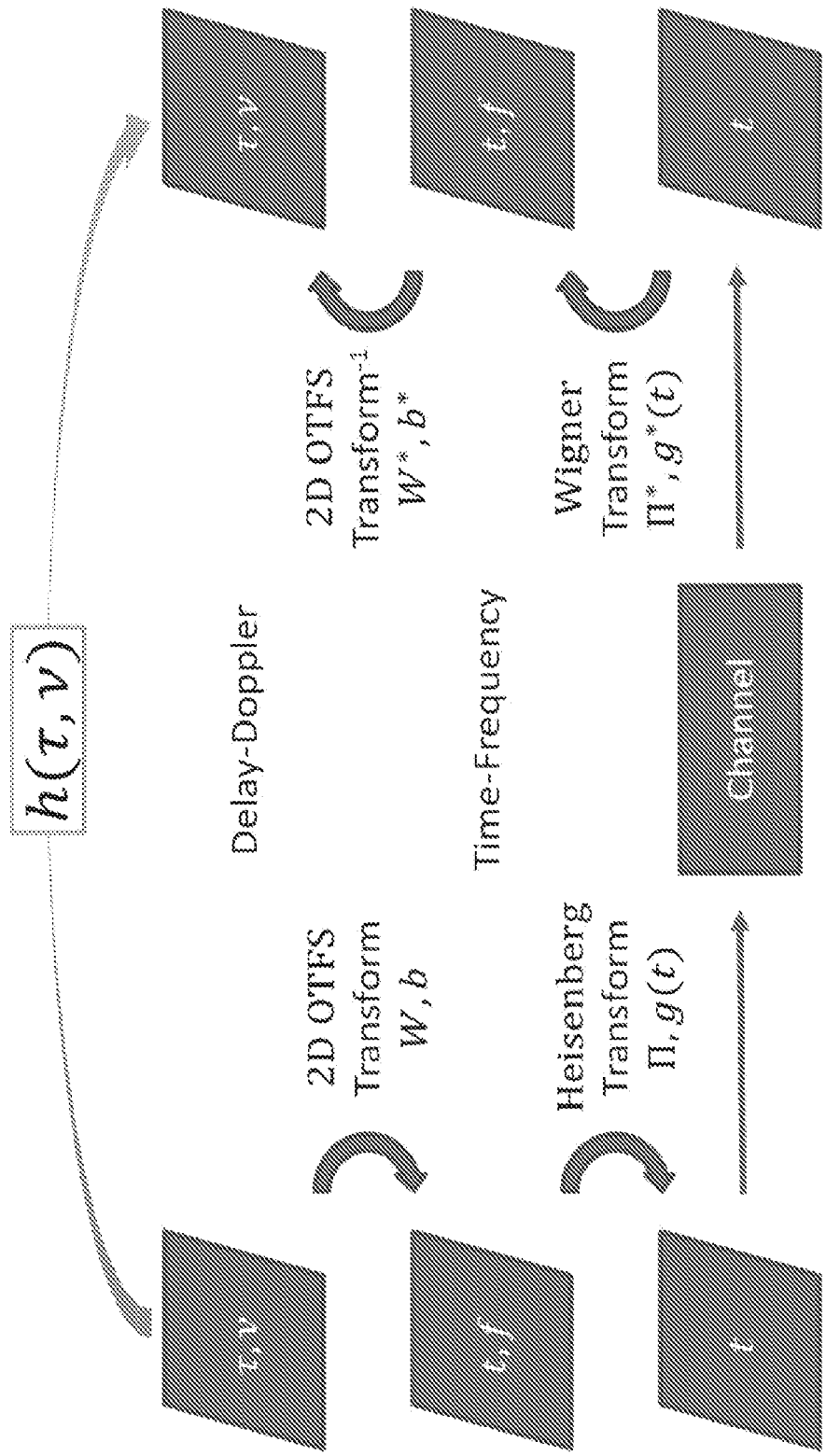
FIG. 17 shows Levels of Abstraction: Signaling over the (i) actual channel with a signaling waveform (ii) the time-frequency Domain (iii) the delay-Doppler Domain
Figure 18:
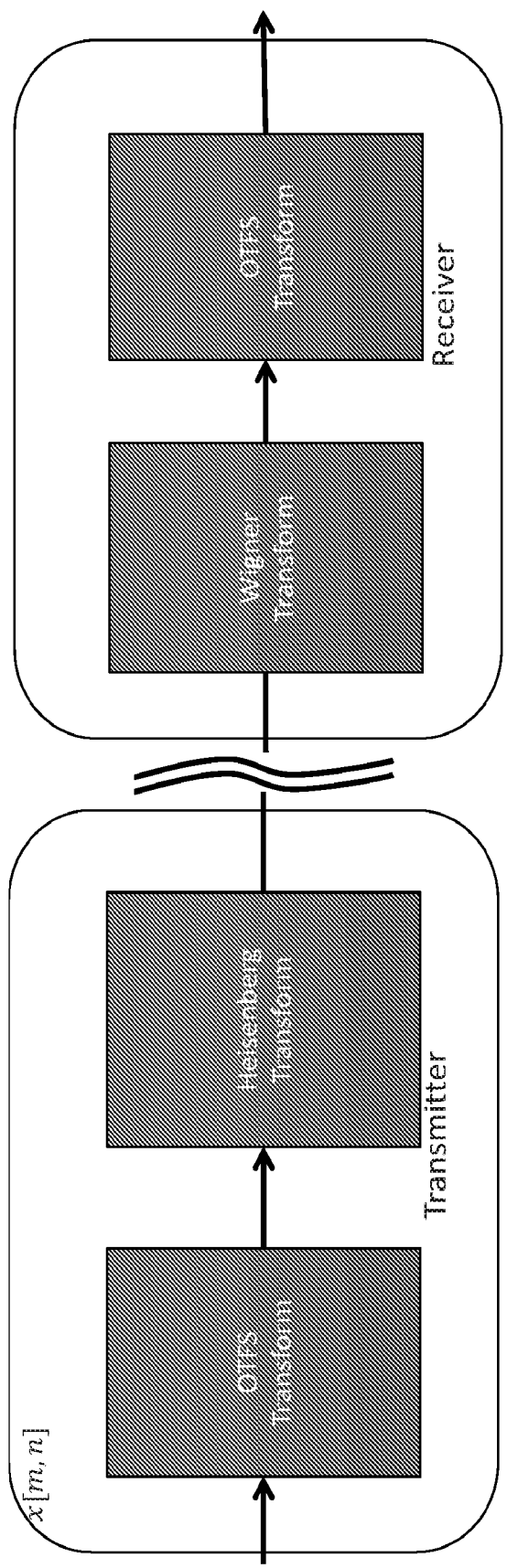
FIG. 18 shows Notation Used to Denote Signals at Various Stages of Transmitter and Receiver

FIG. 17 provides a pictorial view of the two transformations that constitute the OTFS modulation. It shows at a high level the signal processing steps that are required at the transmitter and receiver. It also includes the parameters that define each step, which will become apparent as we further expose each step. Further, FIG. 18 shows a block diagram of the different processing stages at the transmitter and receiver and establishes the notation that will be used for the various signals.

H. The Heisenberg Transform

Our purpose in this section is to construct an appropriate transmit waveform which carries information provided by symbols on a grid in the time-frequency plane. Our intent in developing this modulation scheme is to transform the channel operation to an equivalent operation on the time-frequency domain with two important properties:

The channel is orthogonalized on the time-frequency grid.

The channel time variation is simplified on the time-frequency grid and can be addressed with an additional transform.

Fortunately, these goals can be accomplished with a scheme that is very close to well-known multicarrier modulation techniques, as explained next. We will start with a general framework for multicarrier modulation and then give examples of OFDM and multicarrier filter bank implementations.

Let us consider the following components of a time frequency modulation:

A lattice or grid on the time frequency plane, that is a sampling of the time axis with sampling period T and the frequency axis with sampling period $\Delta f$.

$$\Lambda = \{(nT, m\Delta f), n, m \in \mathbb{Z}\} \quad (8)$$

A packet burst with total duration NT secs and total bandwidth $M\Delta f$ Hz

A set of modulation symbols $X[n, m]$, $n=0, \ldots, N-1$, $m=0, \ldots, M-1$ we wish to transmit over this burst A transmit pulse $g_{tr}(t)$ with the property of being orthogonal to translations by T and modulations by $\Delta f$ $$\langle g_{tr}(t), g_{tr}(t-nT)e^{j2\pi m\Delta f(t-nT)}\rangle = \quad (9)$$

$$\int g_{tr}^*(t)g_{tr}(t-nT)e^{j2\pi m\Delta f(t-nT)}dt = \delta(m)\delta(n)$$

Given the above components, the time-frequency modulator is a Heisenberg operator on the lattice Λ, that is, it maps the two-dimensional symbols X[n, m] to a transmitted waveform, via a superposition of delay-and-modulate operations on the pulse waveform $g_{tr}(t)$ $$s(t) = \sum_{m=-M/2}^{M/2-1} \sum_{n=0}^{N-1} X[n,m]g_{tr}(t-nT)e^{j2\pi m\Delta f(t-nT)} \quad (10)$$

More formally $$x = \Pi_x(g_{tr}): g_{tr}(t) \in \mathcal{H} \xrightarrow{\Pi_x(\cdot)} y(t) \in \mathcal{H} \quad (11)$$

where we denote by $\Pi_x(\cdot)$ the "discrete" Heisenberg operator, parameterized by discrete values X[n, m].

Notice the similarity of above equation and with the channel equation above. This is not by coincidence, but rather because we apply a modulation effect that mimics the channel effect, so that the end effect of the cascade of modulation and channel is more tractable at the receiver. It is not uncommon practice; for example, linear modulation (aimed at time invariant channels) is in its simplest form a convolution of the transmit pulse g(t) with a delta train of QAM information symbols sampled at the Baud rate T.

$$s(t) = \sum_{m=0}^{N-1} X[n]g(t-nT) \quad (12)$$

In our case, aimed at the time varying channel, we convolve-and-modulate the transmit pulse (c.f. the channel Eq. (2)) with a two-dimensional delta train which samples the time frequency domain at a certain Baud rate and subcarrier spacing.

The sampling rate in the time-frequency domain is related to the bandwidth and time duration of the pulse $g_{tr}(t)$ namely its time-frequency localization. In order for the orthogonality condition to hold for a frequency spacing $\Delta f$, the time spacing must be $T \geq 1/\Delta f$. The critical sampling case of $T = 1/\Delta f$ is generally not practical and refers to limiting cases, for example to OFDM systems with cyclic prefix length equal to zero or to filter banks with $g_{tr}(t)$ equal to the ideal Nyquist pulse.

Some examples are as below:

Example 1: OFDM Modulation: Let us consider an OFDM system with M subcarriers, symbol length $T_{OFDM}$, cyclic prefix length $T_{CP}$ and subcarrier spacing $1/T_{OFDM}$. If we substitute in Equation (10) symbol duration $T = T_{OFDM} + T_{CP}$, number of symbols N=1, subcarrier spacing $\Delta f = 1/T_{OFDM}$ and $g_{tr}(t)$ a square window that limits the duration of the subcarriers to the symbol length T $$g_{tr}(t) = \begin{cases} 1/\sqrt{T-T_{CP}}, & -T_{CP} < t < T - T_{CP} \\ 0, & \text{else} \end{cases} \quad (13)$$

then we obtain the OFDM formula. Technically, the pulse of Eq. 3 is not orthonormal but is orthogonal to the receive filter (where the CP samples are discarded) as we will see shortly.

$$x(t) = \sum_{m=-M/2}^{M/2-1} X[n,m]g_{tr}(t)e^{j2\pi m\Delta ft} \quad (14)$$

Example 2: Single Carrier Modulation: Equation (3) reduces to single carrier modulation if we substitute M=1 subcarrier, T equal to the Baud period and $g_{tr}(t)$ equal to a square root raised cosine Nyquist pulse.

Example 3: Multicarrier Filter Banks (MCFB): Equation (3) describes a MCFB if $g_{tr}(t)$ is a square root raised cosine Nyquist pulse with excess bandwidth α, T is equal to the Baud period and $\Delta f = (1+\alpha)/T$.

Expressing the modulation operation as a Heisenberg transform as in Eq. (4) may be counterintuitive. We usually think of modulation as a transformation of the modulation symbols X[m, n] to a transmit waveform s(t). The Heisenberg transform instead, uses X[m, n] as weights/parameters of an operator that produces s(t) when applied to the prototype transmit filter response $g_{tr}(t)$— c.f. Eq. (4). While counterintuitive, this formulation is useful in pursuing an abstraction of the modulation-channel-demodulation cascade effects in a two dimensional domain where the channel can be described as time invariant.

We next turn our attention to the processing on the receiver side needed to go back from the waveform domain to the time-frequency domain. Since the received signal has undergone the cascade of two Heisenberg transforms (one by the modulation effect and one by the channel effect), it is natural to inquire what the end-to-end effect of this cascade is. The answer to this question is given by the following result:

Proposition 1: Let two Heisenberg transforms be parametrized by impulse responses $h_1(\tau, \nu)$, $h_2(\tau, \nu)$ and be applied in cascade to a waveform $g(t) \in \mathcal{H}$. Then $$\Pi_{h_2}(\Pi_{h_1}(g(t))) = \Pi_h(g(t)) \quad (15)$$

where $h(\tau, \nu) = h_2(\tau, \nu) \odot h_1(\tau, \nu)$ is the "twisted" convolution of $h_1(\tau, \nu)$, $h_2(\tau, \nu)$ defined by the following convolve-and-modulate operation $$h(\tau,\nu) = \iint h_2(\tau',\nu')h_1(\tau-\tau',\nu-\nu')e^{j2\pi\nu'(t-\tau')}d\tau'd\nu' \quad (16)$$

Applying the above result to the cascade of the modulation and channel Heisenberg transforms, we can show that the received signal is given by the Heisenberg transform $$r(t) = \Pi_f(g_{tr}(t)) + v(t) = \iint f(\tau,\nu)e^{j2\pi\nu(t-\tau)}g_{tr}(t-\tau)d\nu d\tau + v(t) \quad (17)$$

where v(t) is additive noise and $f(\tau, \nu)$, the impulse response of the combined transform, is given by the twisted convolution of X[n, m] and $h(\tau, \nu)$ $$f(\tau, \nu) = \quad (18)$$

$$h(\tau,\nu) \odot X[n,m] = \sum_{m=-M/2}^{M/2-1}\sum_{n=0}^{N-1} X[n,m]h(\tau-nT, \nu-m\Delta f)e^{j2\pi(\nu-m\Delta f)nT}$$

This result can be considered an extension of the single carrier modulation case, where the received signal through a time invariant channel is given by the convolution of the QAM symbols with a composite pulse, that pulse being the convolution of the transmitter pulse and the channel impulse response.

With this result established we are ready to examine the receiver processing steps.

I. Receiver Processing and the Wigner Transform

Figure 19:
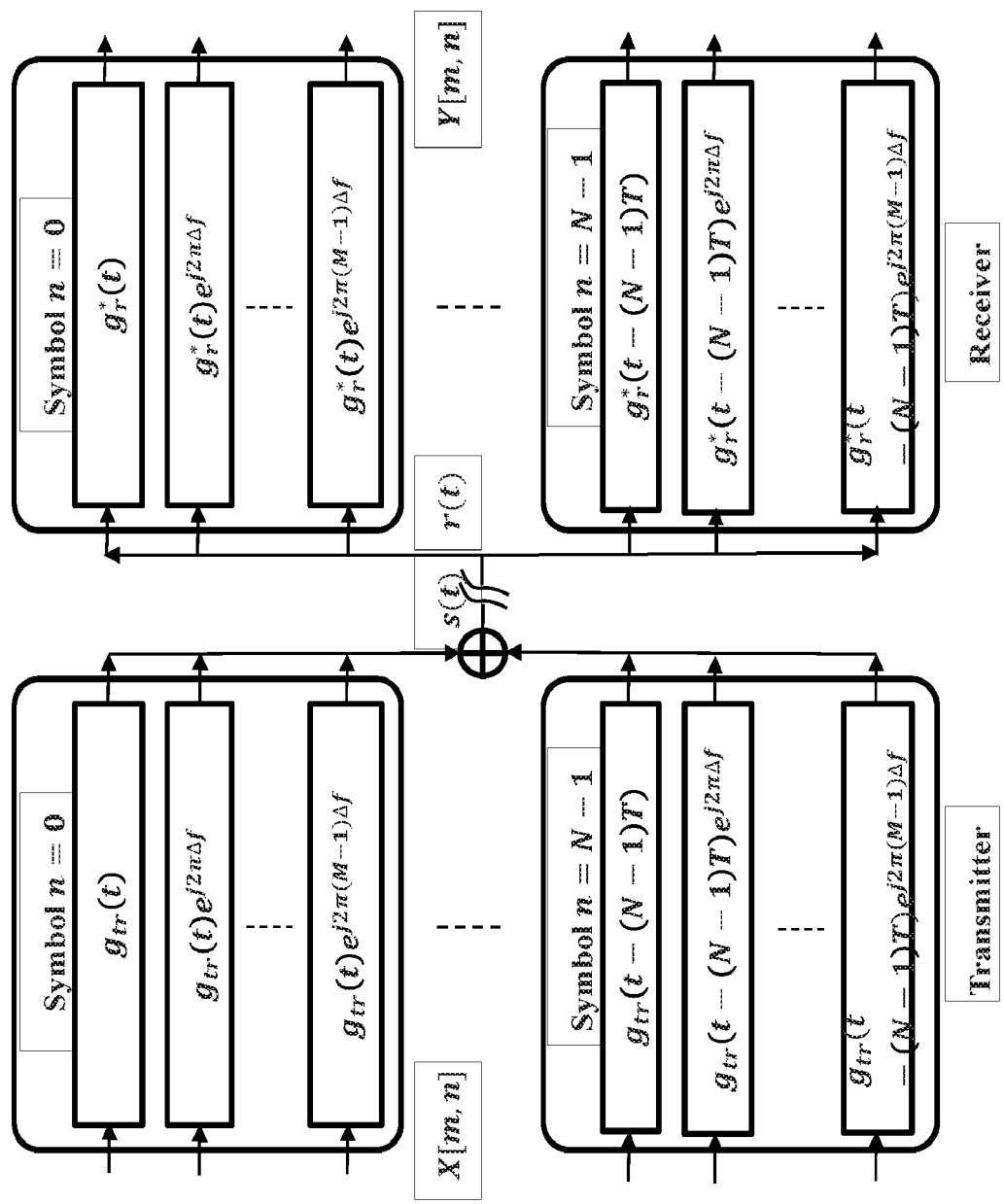
FIG. 19 shows Conceptual Implementation of the Heisenberg Transform in the Transmitter and the Wigner Transform in the Receiver

Typical communication system design dictates that the receiver performs a matched filtering operation, taking the inner product of the received waveform with the transmitter pulse, appropriately delayed or otherwise distorted by the channel. In our case, we have used a collection of delayed and modulated transmit pulses, and we need to perform a matched filter on each one of them. FIG. 19 provides a conceptual view of this processing. On the transmitter, we modulate a set of M subcarriers for each symbol we transmit, while on the receiver we perform matched filtering on each of those subcarrier pulses. We define a receiver pulse $g_r(t)$ and take the inner product with a collection of delayed and modulated versions of it. The receiver pulse $g_r(t)$ is in many cases identical to the transmitter pulse, but we keep the separate notation to cover some cases where it is not (most notably in OFDM where the CP samples have to be discarded).

While this approach will yield the sufficient statistics for data detection in the case of an ideal channel, a concern can be raised here for the case of non-ideal channel effects. In this case, the sufficient statistics for symbol detection are obtained by matched filtering with the channel-distorted, information-carrying pulses (assuming that the additive noise is white and Gaussian). In many well designed multicarrier systems however (e.g., OFDM and MCFB), the channel distorted version of each subcarrier signal is only a scalar version of the transmitted signal, allowing for a matched filter design that is independent of the channel and uses the original transmitted subcarrier pulse. We will make these statements more precise shortly and examine the required conditions for this to be true.

FIG. 19 is only a conceptual illustration and does not point to the actual implementation of the receiver. Typically, this matched filtering is implemented in the digital domain using an FFT or a polyphase transform for OFDM and MCFB respectively. In this paper we are rather more interested in the theoretical understanding of this modulation. To this end, we will consider a generalization of this matched filtering by taking the inner product $<g_r(t-\tau)e^{j2\pi v(t-\tau)}, r(t)>$ of the received waveform with the delayed and modulated versions of the receiver pulse for arbitrary time and frequency offset $(\tau, v)$. While this is not a practical implementation, it allows us to view the operations as a two dimensional sampling of this more general inner product.

Let us define the inner product $$A_{g_r,r}(\tau,v) = <g_r(t-\tau)e^{j2\pi v(t-\tau)}, r(t)> = \int g_r^*(t-\tau)e^{-j2\pi v(t-\tau)}r(t)\,dt \quad (19)$$

The function $A_{g_r,r}(\tau, v)$ is known as the cross-ambiguity function in the radar and math communities and yields the matched filter output if sampled at $\tau=nT$, $v=m\Delta f$ (on the lattice $\Lambda$), i.e., $$Y[n,m] = A_{g_r,r}(\tau,v)|_{\tau=nT, v=m\Delta f} \quad (20)$$

In the math community, the ambiguity function is related to the inverse of the Heisenberg transform, namely the Wigner transform. FIG. 19 provides an intuitive feel for that, as the receiver appears to invert the operations of the transmitter.

The key question here is what the relationship is between the matched filter output $Y[n, m]$ (or more generally $Y(\tau, v)$) and the transmitter input $X[n, m]$. We have already established that the input to the matched filter $r(t)$ can be expressed as a Heisenberg representation with impulse response $f(\tau, v)$ (plus noise). The output of the matched filter then has two contributions $$Y(\tau,v) = A_{g_r,r}(\tau,v) = A_{g_r,[\Pi_f(g_{tr})+v]}(\tau,v) = A_{g_r,\Pi_f(g_{tr})}(\tau,v) + A_{g_r,v}(\tau,v) \quad (21)$$

The last term is the contribution of noise, which we will denote $V(\tau, v) = A_{g_r,v}(\tau, v)$. The first term on the right hand side is the matched filter output to the (noiseless) input comprising of a superposition of delayed and modulated versions of the transmit pulse. We next establish that this term can be expressed as the twisted convolution of the two dimensional impulse response $f(\tau, v)$ with the cross-ambiguity function (or two dimensional cross correlation) of the transmit and receive pulses.

The following theorem summarizes the key result.

Theorem 1: (Fundamental time-frequency domain channel equation). If the received signal can be expressed as $$\Pi_f(g_{tr}(t)) = \iint f(\tau,v)e^{j2\pi v(t-\tau)}g_{tr}(t-\tau)\,dv\,d\tau \quad (22)$$

Then the cross-ambiguity of that signal with the receive pulse $g_{tr}(t)$ can be expressed as $$A_{g_r,\Pi_f(g_{tr})}(\tau,v) = f(\tau,v) \odot A_{g_r,g_{tr}}(\tau,v) \quad (23)$$

Recall from (18) that $f(\tau, v) = h(\tau, v) \odot X[n, m]$, that is, the composite impulse response is itself a twisted convolution of the channel response and the modulation symbols.

Substituting $f(\tau, v)$ from (18) into (21) we obtain the end-to-end channel description in the time frequency domain $$\begin{aligned} Y(\tau, v) &= A_{g_r,\Pi_r(g_{tr})}(\tau, v) + V(\tau, v) \\ &= h(\tau, v) \odot X[n, m] \odot A_{g_r,g_{tr}}(\tau, v) + V(\tau, v) \end{aligned} \quad (24)$$

where $V(\tau, v)$ is the additive noise term. Eq. (24) provides an abstraction of the time varying channel on the time-frequency plane. It states that the matched filter output at any time and frequency point $(\tau, v)$ is given by the delay-Doppler impulse response of the channel twist-convolved with the impulse response of the modulation operator twist-convolved with the cross-ambiguity (or two dimensional cross correlation) function of the transmit and receive pulses.

Evaluating Eq. (24) on the lattice $\Lambda$ we obtain the matched filter output modulation symbol estimates $$\hat{X}[m,n] = Y[n,m] = Y(\tau,v)|_{\tau=nT, v=m\Delta f} \quad (25)$$

In order to get more intuition on Equations (24), (25) let us first consider the case of an ideal channel, i.e., $h(\tau, v) = \delta(\tau)\delta(v)$. In this case by direct substitution we get the convolution relationship $$Y[n, m] = \sum_{m'=-M/2}^{M/2-1} \sum_{n'=0}^{N-1} X[n', m']A_{g_r,g_{tr}}((n-n')T, (m-m')\Delta f) + V[m, n] \quad (26)$$

In order to simplify Eq. (26) we will use the orthogonality properties of the ambiguity function. Since we use a different transmit and receive pulses we will modify the orthogonality condition on the design of the transmit pulse we stated in (9) to a bi-orthogonality condition $$\langle g_{tr}(t), g_r(t-nT)e^{j2\pi m\Delta f(t-nT)}\rangle = \qquad (27)$$

$$\int g_{tr}^*(t)g_r(t-nT)e^{j2\pi m\Delta f(t-nT)}dt = \delta(m)\delta(n)$$

Under this condition, only one term survives in (26) and we obtain $$Y[n,m]=X[n,m]+V[n,m] \qquad (28)$$

where $V[n, m]$ is the additive white noise. Eq. (28) shows that the matched filter output does recover the transmitted symbols (plus noise) under ideal channel conditions. Of more interest of course is the case of non-ideal time varying channel effects. We next show that even in this case, the channel orthogonalization is maintained (no intersymbol or intercarrier interference), while the channel complex gain distortion has a closed form expression.

The following theorem summarizes the result as a generalization of (28).

Theorem 2: (End-to-end time-frequency domain channel equation):

If $h(\tau, \nu)$ has finite support bounded by $(\tau_{max}, \nu_{max})$ and if $A_{g_r,g_{tr}}(\tau, \nu)=0$ for $\tau \in (nT-\tau_{max}, nT+\tau_{max})$, $\nu \in (m\Delta f-\nu_{max}, m\Delta f+\nu_{max})$, that is, the ambiguity function bi-orthogonality property of (27) is true in a neighborhood of each grid point $(m\Delta f, nT)$ of the lattice $\Lambda$ at least as large as the support of the channel response $h(\tau, \nu)$, then the following equation holds $$Y[n,m]=H[n,m]X[n,m]$$

$$H[n,m]=\iint h(\tau,\nu)e^{j2\pi\nu nT}e^{-j2\pi(\nu+m\Delta f)\tau}d\nu d\tau \qquad (29)$$

If the ambiguity function is only approximately bi-orthogonal in the neighborhood of $\Lambda$ (by continuity), then (29) is only approximately true.

Eq. (29) is a fundamental equation that describes the channel behavior in the time-frequency domain. It is the basis for understanding the nature of the channel and its variations along the time and frequency dimensions.

Some observations are now in order on Eq. (29). As mentioned before, there is no interference across $X[n, m]$ in either time n or frequency m.

The end-to-end channel distortion in the modulation domain is a (complex) scalar that needs to be equalized If there is no Doppler, i.e. $h(\tau, \nu)=h(\tau, 0)\delta(\nu)$, then Eq. (23) becomes $$Y[n, m] = X[n, m]\int h(\tau, 0)e^{-j2\pi m\Delta f\tau}d\tau \qquad (30)$$

$$= X[n, m]H(0, m\Delta f)$$

which is the well-known multicarrier result, that each subcarrier symbol is multiplied by the frequency response of the time invariant channel evaluated at the frequency of that subcarrier.

If there is no multipath, i.e. $h(\tau, \nu)=h(0, \nu)\delta(\tau)$, then Eq. (23) becomes $$Y[n,m]=X[n,m]\int h(\nu,0)e^{j2\pi\nu nT}d\tau \qquad (31)$$

Notice that the fading each subcarrier experiences as a function of time nT has a complicated expression as a weighted superposition of exponentials. This is a major complication in the design of wireless systems with mobility like LTE; it necessitates the transmission of pilots and the continuous tracking of the channel, which becomes more difficult the higher the vehicle speed or Doppler bandwidth is.

Example 3: (OFDM modulation). In this case the fundamental transmit pulse is given by (13) and the fundamental receive $$g_r(t) = \begin{cases} 0 & -T_{CP} < t < 0 \\ \dfrac{1}{\sqrt{T-T_{CP}}} & 0 < t < T - T_{CP} \\ 0 & \text{else} \end{cases} \qquad (32)$$

i.e., the receiver zeroes out the CP samples and applies a square window to the symbols comprising the OFDM symbol. It is worth noting that in this case, the bi-orthogonality property holds exactly along the time dimension.

Example 4: (MCFB modulation). In the case of multicarrier filter banks $g_{tr}(t)=g_r(t)=g(t)$. There are several designs for the fundamental pulse $g(t)$. A square root raised cosine pulse provides good localization along the frequency dimension at the expense of less localization along the time dimension. If T is much larger than the support of the channel in the time dimension, then each subchannel sees a flat channel and the bi-orthogonality property holds approximately.

In summary, in this section we described the one of the two transforms that define OTFS. We explained how the transmitter and receiver apply appropriate operators on the fundamental transmit and receive pulses and orthogonalize the channel according to Eq. (29). We further saw via examples how the choice of the fundamental pulse affect the time and frequency localization of the transmitted modulation symbols and the quality of the channel orthogonalization that is achieved. However, Eq. (29) shows that the channel in this domain, while free of intersymbol interference, suffers from fading across both the time and the frequency dimensions via a complicated superposition of linear phase factors.

In the next section we will start from Eq. (29) and describe the second transform that defines OTFS; we will show how that transform defines an information domain where the channel does not fade in either dimension.

J. The 2D OTFS Transform

Notice that the time-frequency response $H[n, m]$ in (29) is related to the channel delay-Doppler response $h(\tau, \nu)$ by an expression that resembles a Fourier transform. However, there are two important differences: (i) the transform is two dimensional (along delay and Doppler) and (ii) the exponentials defining the transforms for the two dimensions have opposing signs. Despite these difficulties, Eq. (29) points in the direction of using complex exponentials as basis functions on which to modulate the information symbols; and only transmit on the time-frequency domain the superposition of those modulated complex exponential bases. This is the approach we will pursue in this section.

This is akin to the SC-FDMA modulation scheme, where in the frequency domain we transmit a superposition of modulated exponentials (the output of the DFT preprocessing block). The reason we pursue this direction is to exploit Fourier transform properties and translate a multiplicative channel in one Fourier domain to a convolution channel in the other Fourier domain.

Given the difficulties of Eq. (29) mentioned above we need to develop a suitable version of Fourier transform and associated sampling theory results. Let us start with the following definitions:

Definition 1: Symplectic Discrete Fourier Transform: Given a square summable two dimensional sequence X[m, n]∈ ℂ (Λ) we define $$x(\tau, v) = \sum_{m,n} X[n, m] e^{-j2\pi(vnT - \tau m \Delta f)} \triangleq SDFT(X[n, m]) \quad (33)$$

Notice that the above 2D Fourier transform (known as the Symplectic Discrete Fourier Transform in the math community) differs from the more well known Cartesian Fourier transform in that the exponential functions across each of the two dimensions have opposing signs. This is necessary in this case, as it matches the behavior of the channel equation.

Further notice that the resulting $x(\tau, v)$ is periodic with periods $(1/\Delta f, 1/T)$. This transform defines a new two dimensional plane, which we will call the delay-Doppler plane, and which can represent a max delay of $1/\Delta f$ and a max Doppler of $1/T$. A one dimensional periodic function is also called a function on a circle, while a 2D periodic function is called a function on a torus (or donut). In this case $x(\tau, v)$ is defined on a torus Z with circumferences (dimensions) $(1/\Delta f, 1/T)$.

The periodicity of $x(\tau, v)$ (or sampling rate of the time-frequency plane) also defines a lattice on the delay-Doppler plane, which we will call the reciprocal lattice $$\Lambda^\perp = \left\{ \left( m\frac{1}{\Delta f}, n\frac{1}{T} \right), n, m \in \mathbb{Z} \right\} \quad (34)$$

The points on the reciprocal lattice have the property of making the exponent in (33), an integer multiple of $2\pi$.

The inverse transform is given by:

$$X[n, m] = \frac{1}{c} \int_0^{\frac{1}{\Delta f}} \int_0^{\frac{1}{T}} x(\tau, v) e^{j2\pi(vnT - \tau m \Delta f)} dv d\tau \triangleq SDFT^{-1}(x(\tau, v)) \quad (35)$$

where $c = T\Delta f$.

We next define a sampled version of $x(\tau, v)$. In particular, we wish to take M samples on the delay dimension (spaced at $1/M\Delta f$) and N samples on the Doppler dimension (spaced at $1/NT$). More formally we define a denser version of the reciprocal lattice $$\Lambda_0^\perp = \left\{ \left( m\frac{1}{M\Delta f}, n\frac{1}{NT} \right), n, m \in \mathbb{Z} \right\} \quad (36)$$

So that $\Lambda^\perp \subseteq \Lambda_0^\perp$. We define discrete periodic functions on this dense lattice with period $(1/\Delta f, 1/T)$, or equivalently we define functions on a discrete torus with these dimensions $$Z_0^\perp = \left\{ \left( m\frac{1}{M\Delta f}, n\frac{1}{NT} \right), m = 0, \ldots, M-1, n = 0, \ldots N-1, \right\} \quad (37)$$

These functions are related via Fourier transform relationships to discrete periodic functions on the lattice Λ, or equivalently, functions on the discrete torus $$Z_0 = \{(nT, m\Delta f), m = 0, \ldots, M-1, n = 0, \ldots N-1,\} \quad (38)$$

We wish to develop an expression for sampling Eq. (33) on the lattice of (37). First, we start with the following definition.

Definition 2: Symplectic Finite Fourier Transform: If $X_p[k, l]$ is periodic with period (N, M), then we define $$x_p[m, n] = \sum_{k=0}^{N-1} \sum_{l=-\frac{M}{2}}^{\frac{M}{2}-1} X_p[k, l] e^{-j2\pi\left(\frac{nk}{N} - \frac{ml}{M}\right)} \triangleq SFFT(X[k, l]) \quad (39)$$

Notice that $x_p[m, n]$ is also periodic with period [M, N] or equivalently, it is defined on the discrete torus $Z_0^\perp$. Formally, the SFFT (X[n, m]) is a linear transformation from ℂ ($Z_0$)→ ℂ ($Z_0^\perp$).

Let us now consider generating $x_p[m, n]$ as a sampled version of (33), i.e., $$x_p[m, n] = x[m, n] = x(\tau, v) \big|_{\tau = \frac{m}{M\Delta f}, v = \frac{n}{NT}}.$$

Then we can show that (39) still holds where $X_p[m, n]$ is a periodization of X[n, m] with period (N, M)

$$X_p[n, m] = \sum_{l,k=-\infty}^{\infty} X[n - kN, m - lM] \quad (40)$$

This is similar to the well-known result that sampling in one Fourier domain creates aliasing in the other domain.

The inverse discrete (symplectic) Fourier transform is given by $$X_p[n, m] = \frac{1}{MN} \sum_{l,k} x[l, k] e^{j2\pi\left(\frac{nk}{N} - \frac{ml}{M}\right)} \triangleq SFFT^{-1}(x[l, k]) \quad (41)$$

where l=0, ..., M−1, k=0, ..., N−1. If the support of X[n, m] is time-frequency limited to $Z_0$ (no aliasing in (40)), then $X_p[n, m] = X[n, m]$ for n, m∈$Z_0$, and the inverse transform (41) recovers the original signal.

In the math community, the SDFT is called "discrete" because it represents a signal using a discrete set of exponentials, while the SFFT is called "finite" because it represents a signal using a finite set of exponentials.

Arguably the most important property of the symplectic Fourier transform is that it transforms a multiplicative channel effect in one domain to a circular convolution effect in the transformed domain. This is summarized in the following proposition:

Proposition 2: Let $X_1[n, m]$∈ ℂ ($Z_0$), $X_2[n, m]$∈ ℂ ($Z_0$) be periodic 2D sequences. Then $$SFFT(X_1[n,m] * X_2[n,m]) = SFFT(X_1[n,m]) \cdot SFFT(X_2[n, m]) \quad (42)$$

where * denotes two dimensional circular convolution.

With this framework established we are ready to define the OTFS modulation.

Discrete OTFS modulation: Consider a set of NM QAM information symbols arranged on a 2D grid x[l, k], k=0, ..., N−1, l=0, ..., M−1 we wish to transmit. We will consider x[l, k] to be two dimensional periodic with period [N, M]. Further, assume a multicarrier modulation system defined by A lattice on the time frequency plane, that is a sampling of the time axis with sampling period T and the frequency axis with sampling period $\Delta f$ (c.f. Eq. (8)).

A packet burst with total duration NT secs and total bandwidth $M\Delta f$ Hz.

Transmit and receive pulses $g_{tr}(t)$, $g_{tr}(t) \in L_2(\mathbb{R})$ satisfying the bi-orthogonality property of (27).

A transmit windowing square summable function $W_{tr}[n, m] \in \mathbb{C}(\Lambda)$ multiplying the modulation symbols in the time-frequency domain A set of modulation symbols X[n, m], n=0, ..., N−1, m=0, ..., M−1 related to the information symbols x[k, l] by a set of basis functions $b_{k,l}[n, m]$ $$X[n, m] = \frac{1}{MN} W_{tr}[n, m] \sum_{k=0}^{N-1} \sum_{l=0}^{M-1} x[l, k] b_{k,l}[n, m] \quad (43)$$

$$b_{k,l}[n, m] = e^{j2\pi\left(\frac{ml}{M} - \frac{nk}{N}\right)}$$

where the basis functions $b_{k,l}[n, m]$ are related to the inverse symplectic Fourier transform (c.f., Eq. (41)).

Given the above components, we define the discrete OTFS modulation via the following two steps $$X[n,m] = W_{tr}[n,m]\text{SFFT}^{-1}(x[k,l])$$

$$s(t) = \Pi_X(g_{tr}(t)) \quad (44)$$

The first equation in (44) describes the OTFS transform, which combines an inverse symplectic transform with a widowing operation. The second equation describes the transmission of the modulation symbols X[n, m] via a Heisenberg transform of $g_{tr}(t)$ parameterized by X[n, m]. More explicit formulas for the modulation steps are given by Equations (41) and (10).

While the expression of the OTFS modulation via the symplectic Fourier transform reveals important properties, it is easier to understand the modulation via Eq. (43), that is, transmitting each information symbol x[k, l] by modulating a 2D basis function $b_{k,l}[n, m]$ on the time-frequency plane.

Discrete OTFS demodulation: Let us assume that the transmitted signal s(t) undergoes channel distortion according to (7), (2) yielding r(t) at the receiver. Further, let the receiver employ a receive windowing square summable function $W_r[n, m]$. Then, the demodulation operation consists of the following steps:

Matched filtering with the receive pulse, or more formally, evaluating the ambiguity function on $\Lambda$ (Wigner transform) to obtain estimates of the time-frequency modulation symbols $$Y[n,m] = A_{g_r,y}(\tau,\nu)|_{\tau=nT,\nu=m\Delta f} \quad (45)$$

windowing and periodization of Y[n, m]

$$Y_w[n,m] = W_r[n,m]Y[n,m] \quad (46)$$

$$Y_p[n, m] = \sum_{k,l=-\infty}^{\infty} Y_w[n - kN, m - lM]$$

and applying the symplectic Fourier transform on the periodic sequence $Y_p[n, m]$ $$\hat{x}[l,k] = y[l,k] = \text{SFFT}(Y_p[n,m]) \quad (47)$$

The first step of the demodulation operation can be interpreted as a matched filtering operation on the time-frequency domain as we discussed earlier. The second step is there to ensure that the input to the SFFT is a periodic sequence. If the trivial window is used, this step can be skipped. The third step can also be interpreted as a projection of the time-frequency modulation symbols on the orthogonal basis functions $$\hat{x}[l, k] = \sum_{m=0}^{M-1} \sum_{n=0}^{N-1} \hat{X}(n, m) b_{k,l}^*(n, m) \quad (48)$$

$$b_{k,l}^*(n, m) = e^{-j2\pi\left(\frac{lm}{L} - \frac{kn}{K}\right)}$$

The discrete OTFS modulation defined above points to efficient implementation via discrete-and-periodic FFT type processing. However, it does not provide insight into the time and bandwidth resolution of these operations in the context of two dimensional Fourier sampling theory. We next introduce the continuous OTFS modulation and relate the more practical discrete OTFS as a sampled version of the continuous modulation.

Continuous OTFS modulation: Consider a two dimensional periodic function $x(\tau, \nu)$ with period $[1/\Delta f, 1/T]$ we wish to transmit; the choice of the period may seem arbitrary at this point, but it will become clear after the discussion in the next section. Further, assume a multicarrier modulation system defined by A lattice on the time frequency plane, that is a sampling of the time axis with sampling period T and the frequency axis with sampling period $\Delta f$ (c.f. Eq. (8)).

Transmit and receive pulses $g_{tr}(t)$, $g_{tr}(t) \in L_2(\mathbb{R})$ satisfying the bi-orthogonality property of (27).

A transmit windowing function $W_{tr}[n, m] \in \mathbb{C}(\Lambda)$ multiplying the modulation symbols in the time-frequency domain Given the above components, we define the continuous OTFS modulation via the following two steps $$X[n,m] = W_{tr}[n,m]\text{SDFT}^{-1}(x(\tau,\nu))$$

$$s(t) = \Pi_X(g_{tr}(t)) \quad (49)$$

The first equation describes the inverse discrete time-frequency symplectic Fourier transform [c.f. Eq. (35)] and the windowing function, while the second equation describes the transmission of the modulation symbols via a Heisenberg transform [c.f Eq. (10)].

Continuous OTFS demodulation: Let us assume that the transmitted signal s(t) undergoes channel distortion according to (7), (2) yielding r(t) at the receiver. Further, let the receiver employ a receive windowing function $W_r[n, m] \in \mathbb{C}(\Lambda)$. Then, the demodulation operation consists of two steps:

Evaluating the ambiguity function on $\Lambda$ (Wigner transform) to obtain estimates of the time-frequency modulation symbols $$Y[n,m] = A_{g_r,y}(\tau,\nu)|_{\tau=nT,\nu=m\Delta f} \quad (50)$$

Windowing and applying the symplectic Fourier transform on the modulation symbols $$\hat{x}(\tau,\nu) = \text{SDFT}(W_r[n,m]Y[n,m]) \quad (51)$$

Notice that in (50), (51) there is no periodization of Y [n, m], since the SDFT is defined on aperiodic square summable sequences. The periodization step needed in discrete OTFS can be understood as follows. Suppose we wish to recover the transmitted information symbols by performing a continuous OTFS demodulation and then sampling on the delay-Doppler grid $$\hat{x}(l, k) = \hat{x}(\tau, \nu)|_{\tau=\frac{m}{M\Delta f}, \nu=\frac{n}{NT}} \quad (52)$$

Since performing a continuous symplectic Fourier transform is not practical we consider whether the same result can be obtained using SFFT. The answer is that SFFT processing will produce exactly the samples we are looking for if the input sequence is first periodized (aliased)—see also (39) (40).

K. Iterative 2D Equalization of OTFS Signals

A 2-D equalizer may be used to extract data bits that are modulated on symbols received via OTFS modulation. The iterative equalization techniques described herein could be implemented with the dispersed OTFS receiver implementations described throughout the present document.

K.1 Brief Introduction

A system with N transmit antennas and M receives antennas, is used to pass information over a multipath channel. Information bits, b, are encoded into coded bits, c, using an Forward Error Correction (FEC) code (such as convolutional code, turbo code or LDPC code). These coded bits are grouped into groups of q bits, optionally interleaved and mapped to symbols x in a finite constellation $\Omega$(such as $2^q$-QAM) multiplexed on a grid on the 2-D Delay Doppler grid. These symbols are transformed by a 2-D Inverse Symplectic Fourier transform to symbols X multiplexed on a reciprocal grid on the time frequency plane. These symbols are OFDM modulated and transmitted over the N antennas. The signal, received in M antennas, is OFDM demodulated and processed as a 2-D Time-Frequency grid in the receiver.

In the 2-D Time-Frequency grid, the channel equation can be written individually for each symbol (or time-frequency point) indexed by (i, j) as $$Y_{M\times 1}^{(i,j)} = H_{M\times N}^{(i,j)} \cdot X_{N\times 1}^{(i,j)} + W_{M\times 1}^{(i,j)} \quad (53)$$

where $W_{M\times 1}^{(i,j)}$ represent a vector of AWGN samples with expectation zero and variance $R_W$. The 2-D equalizer computes estimations of the transmitted symbols $\hat{x}$ from the received samples Y, the channel estimations H and the noise variance $R_W$. In a non-iterative receiver, the estimated samples are transformed to the Delay-Doppler domain via a 2-D Symplectic Fourier transform and then converted to bit likelihoods, which are passed to FEC decoder to generate estimates, $\hat{b}$, on the information bits.

K.2. Iterative 2-D Equalizer

Figure 22:
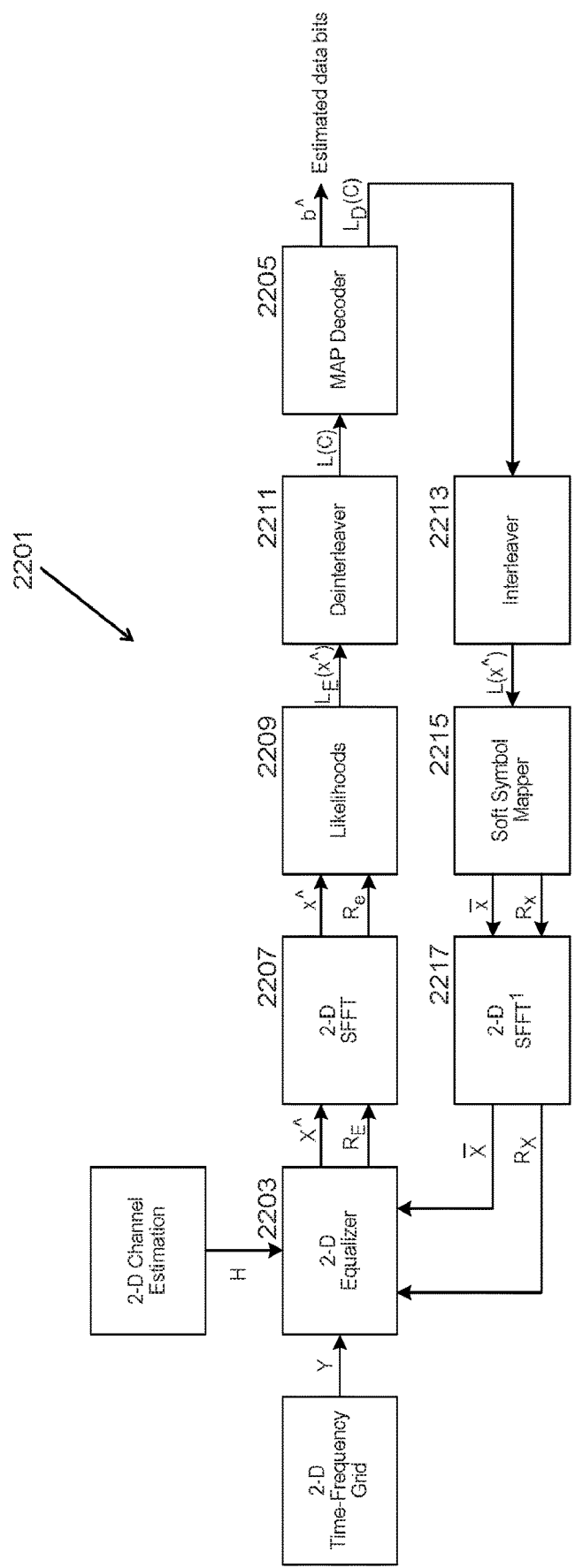
FIG. 22 shows a block diagram showing an example 2-D iterative equalizer

FIG. 22 is a block diagram of an example embodiment of an iterative 2-D equalizer 2201. The 2-D Iterative equalizer, illustrated in FIG. 22, iterates between the 2-D equalizer 2203 and the FEC MAP decoder 2205, by passing information from one to the other. After several iterations, the MAP decoder outputs estimation on the information bits. In various embodiments, the iteration termination criteria may be based on a total number of iterations, meeting, but not exceeding, a time budget for the iterative process, the improvement in successive iterations falling below a threshold, and so on.

K.2.1 Example Embodiments of the 2-D Equalizer (2203)

In some embodiments, the 2-D equalizer may be implemented as an affine MMSE equalizer, computing the Wiener estimator of X $$\hat{X} = CY + (I - CH)\bar{X} \quad (54)$$

where $C = R_{XY} R_Y^{-1}$ and I is the identity matrix. Note that C is a function of $R_X$ and $R_W$. For the first iteration there is no prior information on the symbols of X, therefore we set $\bar{X}=0$ and $R_X=I$. The 2-D equalizer also computes the variance of the estimation error, denoted as $R_E$.

K.2.2 2-D SFFT (2207)

The estimated symbols and error variances, $\hat{X}$ and $R_E$ respectively, are transformed from the 2-D Time-Frequency grid to the 2-D Delay-Doppler grid via a 2-D Symplectic Fourier transform to $\hat{x}$ and $R_e$ respectively.

K.2.3 Likelihoods (2209)

Likelihoods for the coded bits $L_E(\hat{x})$, are computed from the symbols $\hat{x}$. Gaussian distribution may be assumed for $\hat{x}$ and the likelihoods can be derived from it. The probabilities for this case are $$P(\hat{x} \mid x = \omega) \propto e^{-\frac{1}{R_Z}(\hat{x} - \mu(\omega, A))^2} \quad (55)$$

where $\omega \in \Omega$ is a constellation symbol and $$A = 1 - R_e R_X^{-1}$$

$$R_Z = A R_e$$

$$\mu(\omega, A) = \omega A + (1-A)\bar{x} \quad (56)$$

Note that $\bar{x}$ is defined in equation (59). For each symbols, the extrinsic coded bits log likelihoods ratio (LLR) can be derived as $$L_E(\hat{x})_i = \log\left(\frac{\sum_{\omega: s(\omega)_i = 1} P(\hat{x} \mid x = \omega) \cdot \prod_{j \neq i} P(\omega)_j}{\sum_{\omega: s(\omega)_i = 0} P(\hat{x} \mid x = \omega) \cdot \prod_{j \neq i} P(\omega)_j}\right) \quad (57)$$

where i,j=0, ..., q−1, s($\omega$) is the constellation bits label that is associated with the constellation symbol $\omega$ and $P(\omega)_j$ is defined in equation (58).

K.2.4 Deinterleaver (2211)

The deinterleaver permutes the likelihoods $L_E(\hat{x})$ to L(C). These likelihoods will be used as a priori information for the MAP decoder. In some implementations this deinterleaver might be optional.

K.2.5 MAP Decoder (2205)

The Maximum A Posteriori decoder computes the a posteriori probabilities (APP's) of the information bits and also the extrinsic probabilities for the coded bits, which when using LLRs, are the APP's minus the a priori inputs.

K.2.6 Interleaver (2213)

The interleaver permutes the likelihoods $L_D(C)$ to $L(\hat{x})$. These likelihoods will be used as a priori information for the MAP decoder. Note that in some implementations this interleaver might be optional.

K.2.7 Symbol Mapper (2215)

The symbol mapper estimates the probabilities of each constellation symbol $\omega \in \Omega$ from the likelihoods values $L(z)$:

$$P(\omega)_j \cong \frac{1}{2}\left(1 + (2 \cdot s(\omega)_j - 1) \cdot \tanh\left(\frac{L(\hat{x})_j}{2}\right)\right) \quad (58)$$

$$P(\omega) \cong \prod_{j=0}^{q-1} P(\omega)_j$$

These probabilities are used for computing the expectation of the constellation and the variance:

$$\bar{x} = \sum_{i=0}^{q-1} \omega \cdot P(\omega) \quad (59)$$

$$R_x = \sum_{i=0}^{q-1} \omega \omega^H P(\omega) - \bar{x}\bar{x}^H$$

K.2.8 2-D SFFT$^{-1}$ (2217)

The 2-D Delay-Doppler domain symbols' expectation and variance $\bar{x}$ and $R_x$ are transformed to $\hat{X}$ and $R_X$ in the 2-D Time-Frequency domain using a 2-D Inverse Symplectic Fourier transform to transform from the delay-Doppler domain to the Time-Frequency domain. These are used as priors to the 2-D Equalizer in the next iteration. In some embodiments, the 2-D transforms used by operation 2207 and 2217 may be swapped. In other words, an inverse SFFT may be used in the operation 2207, while an SFFT may be used in the operation 2217.

In some embodiments, the iterative 2-D Equalizer may be operated so that the receiver gets side information about some resource elements in the time-frequency grid that have been "erased" (e.g., not transmitted, or not useable) and the receiver can ignore them. The receiver may skip equalization for these resources and just uses directly the prior estimates as outputs for the equalizer. In this case, Eq (54) simply becomes for these resources: $\hat{X}=\bar{X}$.

K.3. Self-Iterative 2-D Equalizer (2300)

Figure 23:
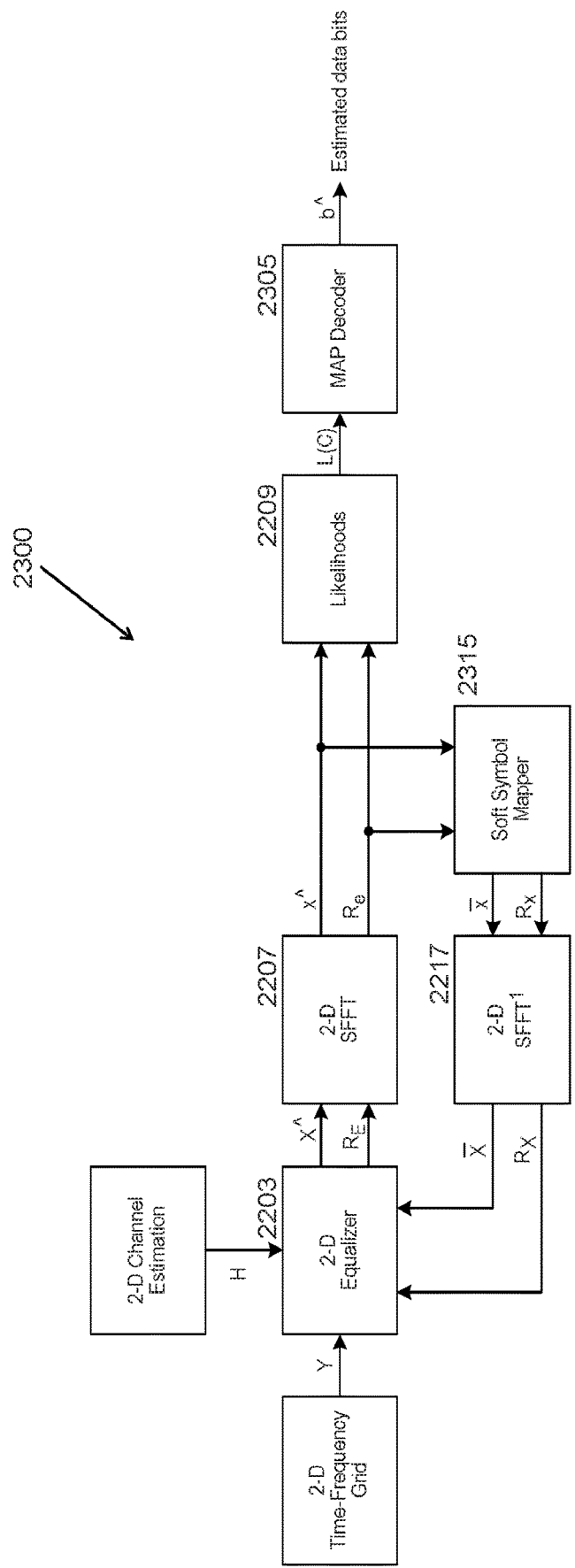
FIG. 23 shows a block diagram showing an example of a self-iterative 2-D equation.

In the scheme 2300, shown in FIG. 23, the 2-D equalizer 2203 generates symbols estimations $\hat{x}$ and $R_e$ in the 2-D Delay-Doppler domain in a similar way to the one described in the previous section. However, these estimates are fed directly to the soft symbol mapper 2315 to generate along with 2-D inverse Symplectic Fourier transform 2217, new priors for the 2-D equalizer 2203. After a number of iterations, with termination criteria described as before, these estimations are converted to coded bits likelihoods and passed to the FEC decoder 2305 to generate estimation of the information bits.

Figure 20:
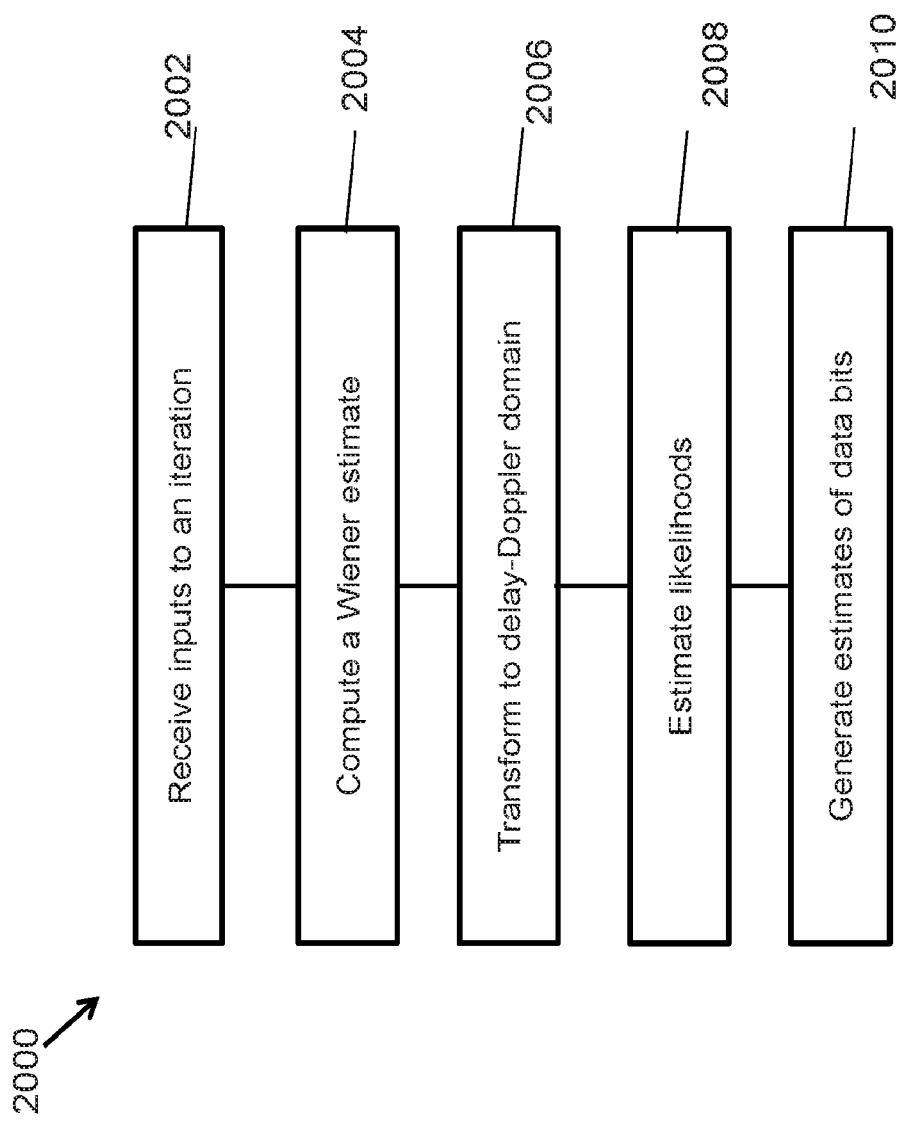
FIG. 20 shows a flowchart of an example wireless communication reception method.

As depicted in the flowchart of FIG. 20, a wireless communication method 2000 for recovering information bits from a received signal, by performing iterative two dimensional equalization includes receiving (2002), at an iterative equalizer, iteration inputs including a two dimensional estimate of a wireless channel over which the received signal is received, a stream of received symbols, a symbol estimate from a previous iteration, an input autocorrelation matrix estimate from the previous iteration, computing (2004), from the iteration inputs, a Wiener estimate of the stream of received symbols, transforming (2006) the Wiener estimate to symbol estimates a two dimensional delay-Doppler grid using a two-dimensional symplectic Fourier transform, which may be a fast SFFT or a fast SFFT$^{-1}$, estimating (2008) likelihoods of the symbol estimates in the two dimensional delay-Doppler grid, and generating (2010) estimates of data from the likelihoods. Various embodiments and options are further described in the description associated with FIG. 22. For example, as described with respect to operations 2207 and 2217, in some embodiments, two-dimensional symplectic Fourier transforms that are inverse of each other may be used in these operations. In other words, 2207 may correspond to an SFFT while 2217 may correspond to an inverse SFFT or vice versa.

In some embodiments the generating the estimate may include deinterleaving the likelihoods and performing error correction. As depicted in the example embodiment in FIG. 23, in some embodiments, the feedback direction processing may include generating a symbol estimate and an input autocorrelation matrix estimate for a next iteration of the method 2000. The processing in the feedback direction may include performing soft symbol mapping using the likelihoods resulting in intermediate symbol estimates and an intermediate autocorrelation estimate, and generating the symbol estimate and the input autocorrelation matrix estimate by transforming, using an inverse of the two-dimensional symplectic Fourier transform, the intermediate symbol estimates and the intermediate autocorrelation estimate. In various embodiments, the two-dimensional symplectic Fourier transform may be SFFT or SFFT$^{-1}$.

In some embodiments, the receiver that implements the method 2000 may get side information about some resource elements in the time-frequency grid that have been "erased" (not transmitted, or no t useable) and the receiver can ignore them. The receiver may then skip the equalization for them and just uses directly the prior estimates as outputs for the equalizer. In this case, Eq (2) simply becomes for these resources: $\hat{X}=\bar{X}$.

Figure 21:
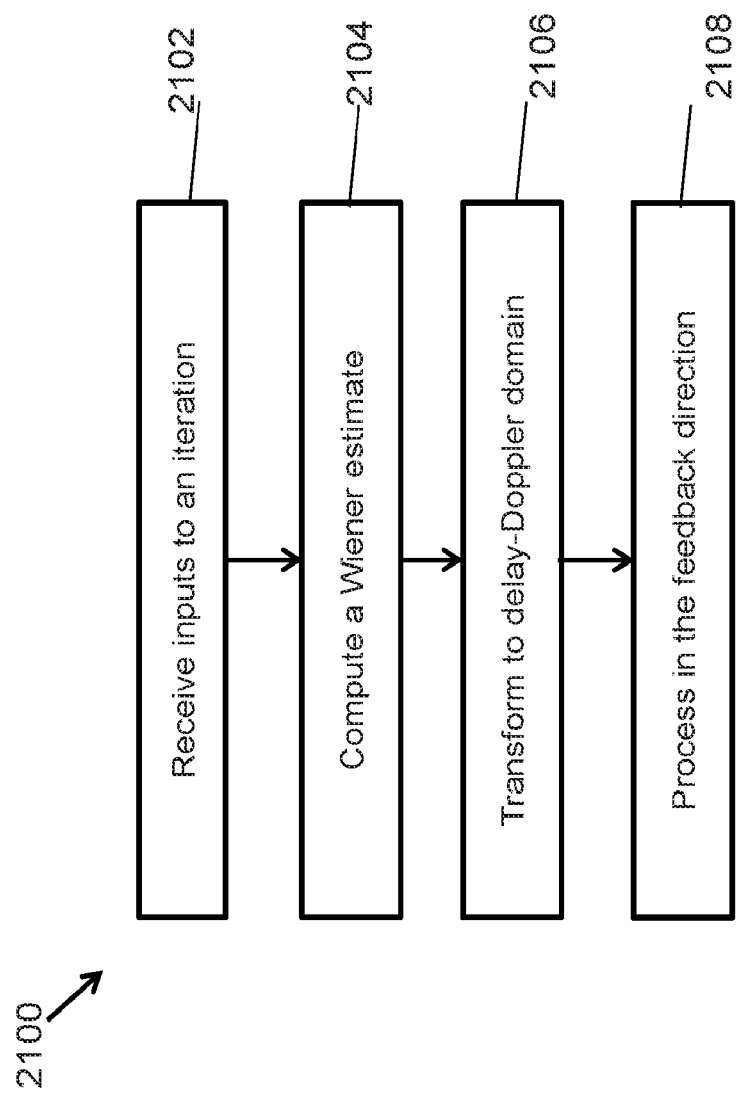
FIG. 21 shows flowchart of another example wireless communication reception method.

FIG. 21 illustrates a flowchart example for a wireless communication method 2100 for recovering information bits from a received signal, by performing iterative two dimensional equalization is disclosed. The method 2100 includes receiving (2102), at an iterative equalizer, iteration inputs including a two dimensional estimate of a wireless channel over which the received signal is received, a stream of received symbols, a symbol estimate from a previous iteration, an input autocorrelation matrix estimate from the previous iteration, computing (2104), from the iteration inputs, a Wiener estimate of the stream of received symbols, transforming (2106) the Wiener estimate to symbol estimates a two dimensional delay-Doppler grid using a two-dimensional symplectic Fourier transform, and processing (2108) in a feedback direction, by generating a symbol estimate and an input autocorrelation matrix estimate for a next iteration.

L. Iterative Receivers

Figure 24:
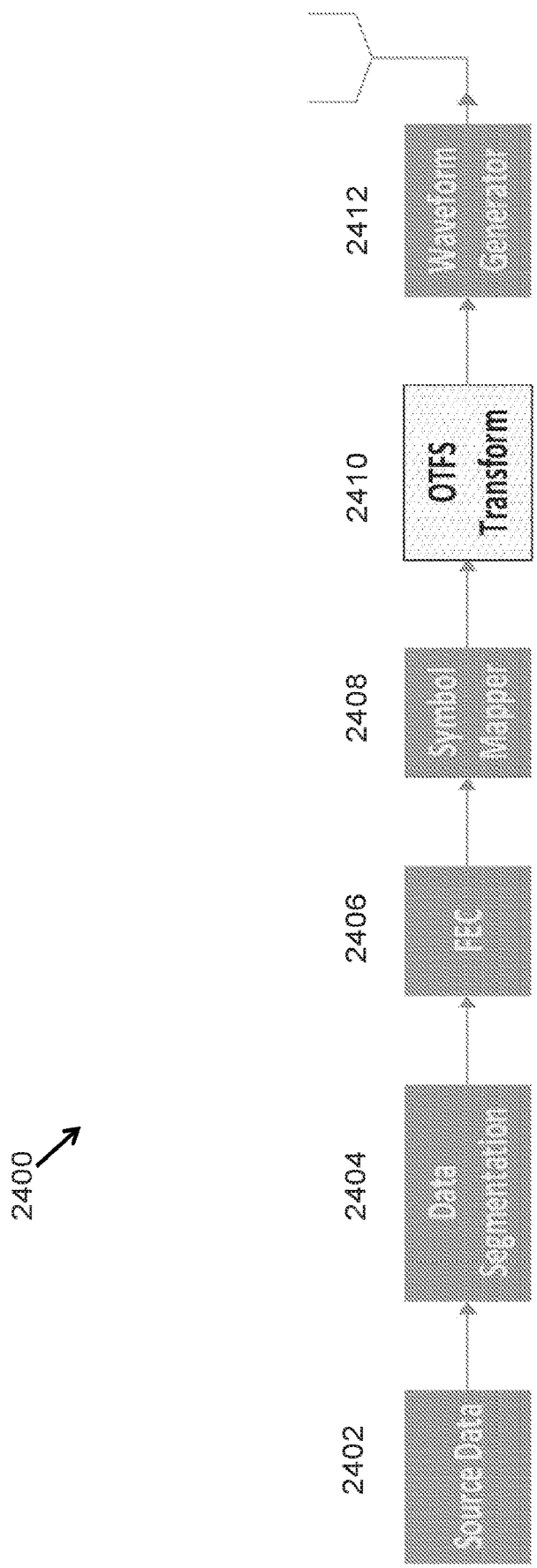
FIG. 24 shows a block diagram showing an example transmission system.

A typical wireless signal transmission system (which may modulate signals using orthogonal time frequency space modulation, or OTFS) usually may include a transmit chain 2400, as shown in FIG. 24. Source data 202 is segmented into blocks (2404), which are encoded by a Forward-Error-Correction (FEC) code of rate R into codewords (2406). These codewords are segmented (2408) into groups of q bits where each group is mapped to a constellation symbol (such as M-QAM, where $2^q=M$). These symbols may be transformed by an OTFS transform (2410) and then used for the generation of the transmission waveform (2412).

In transmit chain 2400, all the source bits have (almost) equal protection by the FEC code, but the coded bits, which are mapped into different positions in the constellation symbol's label, do not typically have equal protection. Some of the bits in the constellation label may be more reliable than other bits (have lower probability of error). For example, in some standard constellation mappings, such as Gray mapping, the Most-Significant-Bits (MSBs) are typically more reliable than the Least-Significant-Bits (LSBs).

Described herein are alternative method for data segmentation and encoding along with its matching iterative receiver, which is advantageous in terms of error-rate performance.

M. Multi-Level Data Segmentation and Encoding

Figure 25:
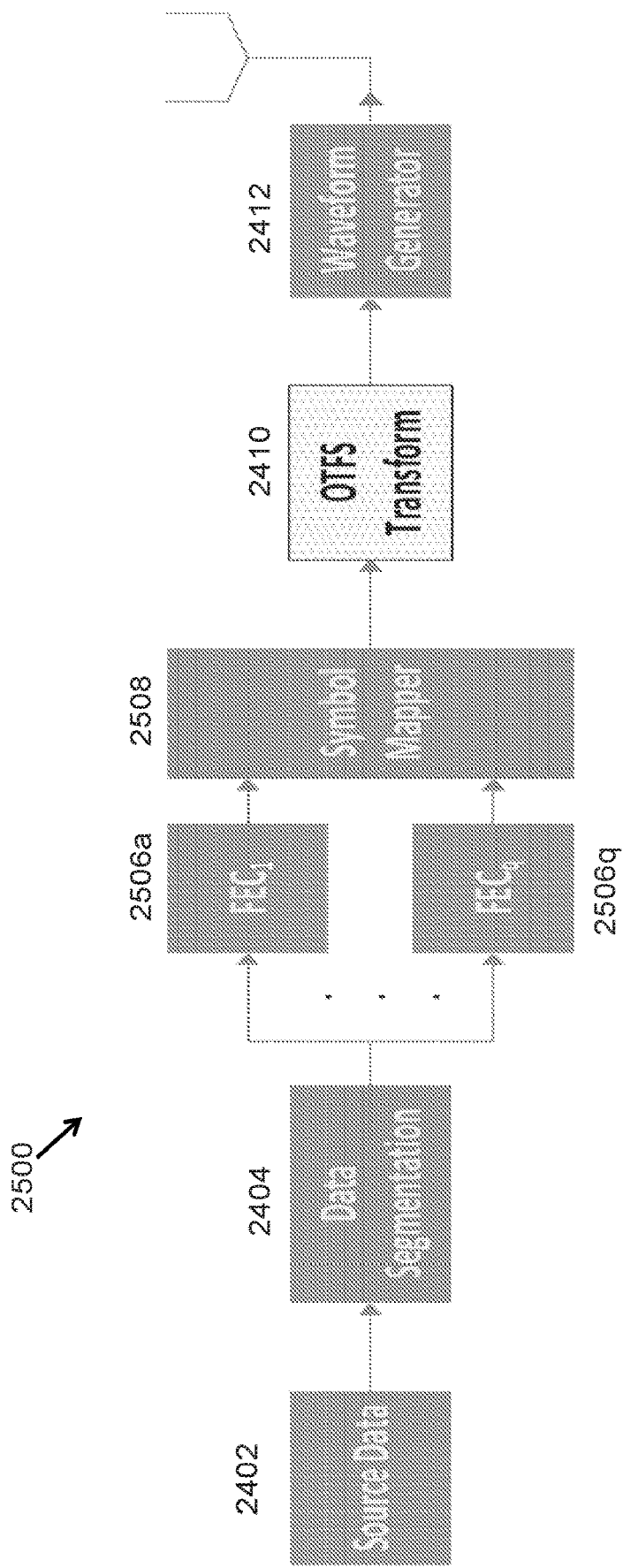
FIG. 25 shows a block diagram of an example of a multi-level transmission system.

FIG. 25 depicts an example of a transmit chain 2500 that use multi-level data segmentation and encoding. In the scheme implemented by the transmit chain 2500, shown in FIG. 25, the data is segmented into q multiple blocks of different sizes and encoded in q different levels by multiple FEC codes (2506a to 2506q) of different rates $R_1, R_2, \ldots, R_q$. In the simplest case, each FEC output is used to map a specific bit in each constellation symbol. For example, 8-QAM may be encoded with 3 levels using 3 different FEC codes. Their output maps the MSB, middle bit and LSB of the constellation symbol's label.

In various embodiments, the number of levels may be smaller than $\log_2 M$ and each FEC may be connected to more than one bit in the constellation label. For example, in constellation mappings (2508) where the real part of the complex constellation is independent of the imaginary part, pairs of constellation bits (one mapped to the real and one mapped to the imaginary) may be encoded together.

To achieve the best error-rate performance, the different FEC code rates may be optimally selected along with the choice of the constellation mapping.

N. Iterative Equalization & Decoding of Multi-Level Encoded Symbols

Figure 26:
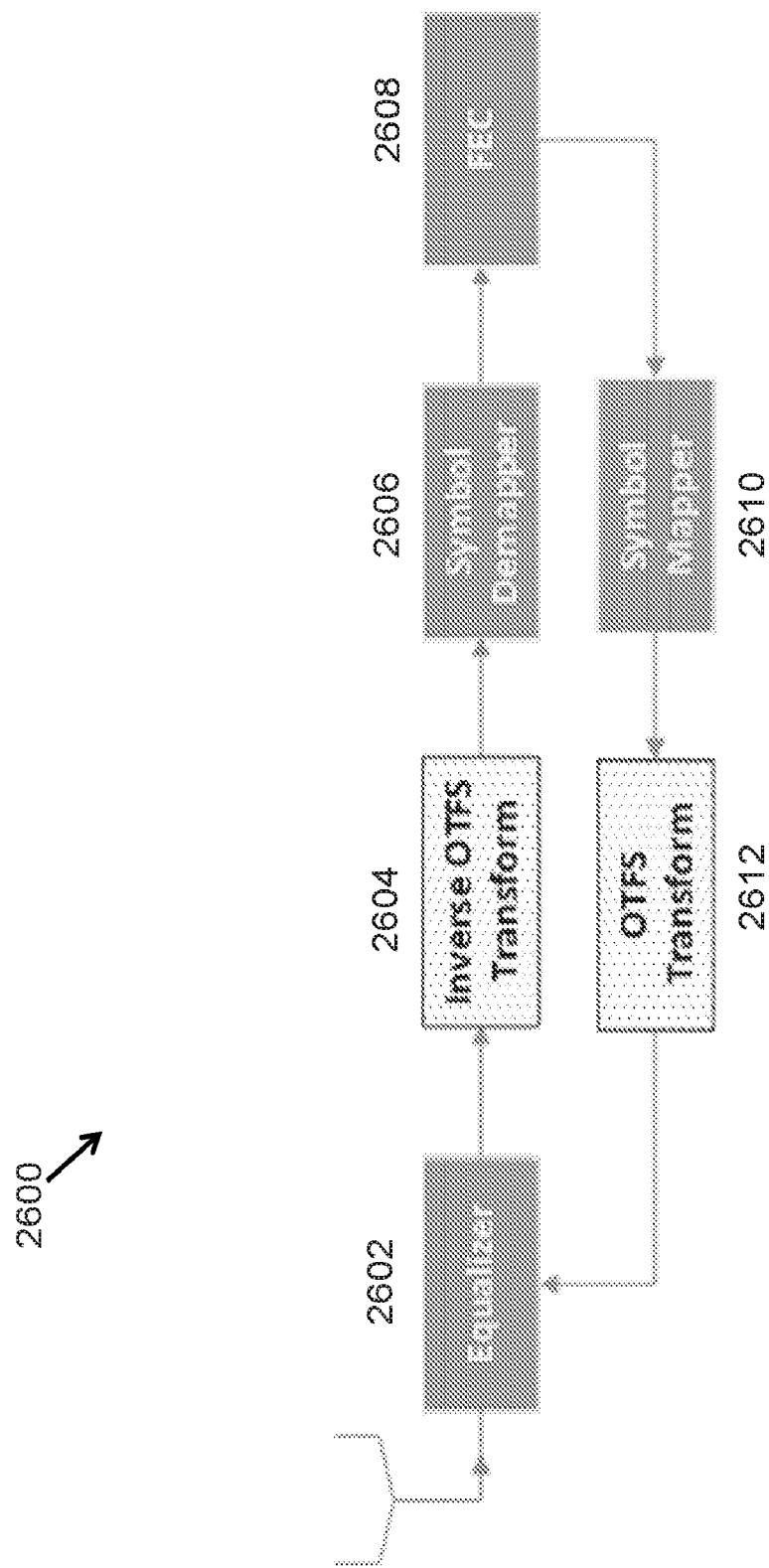
FIG. 26 shows a block diagram of an iterative receiver apparatus.

In general, iterative receivers exchange extrinsic information between the equalizer and the FEC decoder to achieve close to optimal performance, as shown in FIG. 26 for an OTFS receiver 2600. The equalizer 2602 uses prior information on the data symbols coming from the FEC feedback path to improve the equalization of the symbols. This feedback path comprises a symbol mapper 2610 and OTFS transformation module 2612. Then, these symbols are converted to bit likelihoods that are FEC decoded. Several iterations are performed until all the source data is decoded correctly, or until some other stopping criteria is met. An inverse OTFS transform module 2604 may apply inverse OTFS transform and a symbol demapper 2606 may recover bits from modulation symbols.

Compared to the technique described next, the error-rate performance of the scheme 2600 may be degraded. One reason for the degradation may be because of the mixture of bits with different level of reliability in every FEC codeword that is being decoded. The constellation bits with low reliability make it harder for the FEC decoder to converge to the correct codeword and therefore, the feedback to the equalizer has less information to improve the equalization.

Figure 27:
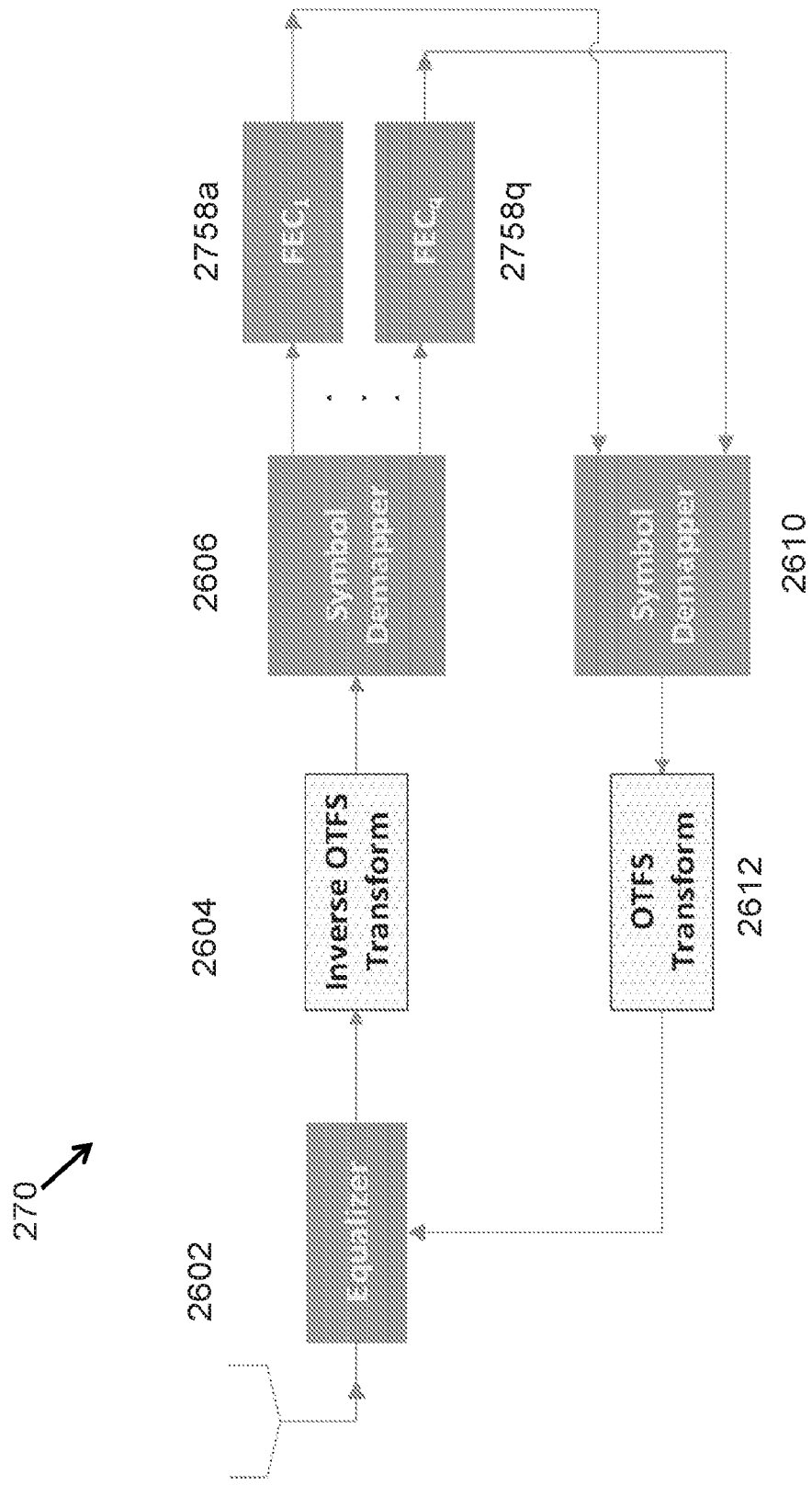
FIG. 27 shows a block diagram of an example iterative receiver apparatus that uses multi-level decoding.

When multi-level encoding is applied at the transmitter (e.g., as shown in FIG. 25), the iterative receiver 2750, in each decoding iteration, decodes only a part of the constellation bits. It typically starts with the most reliable bits and then proceeds in the next iterations to less reliable ones. This scheme, shown in FIG. 27, allows the equalizer to receive in earlier iterations priors, which are dominant from the constellation symbols point of view and better improve the equalization (see FEC decoders 2758a to 2758q). When the FEC has successfully decoded one level, it switches to decode the next one. The receiver continues to iterate until all levels have been decoded successfully or until some other stopping criteria is met. The most reliable bits are often bits that are used to decide the "macro" region within the constellation map where a symbol lies—e.g., the quadrant in which a constellation symbol of a 4 or 8 QAM signal lies, followed by sub-quadrant within the quadrant, and so on.

Figure 28:
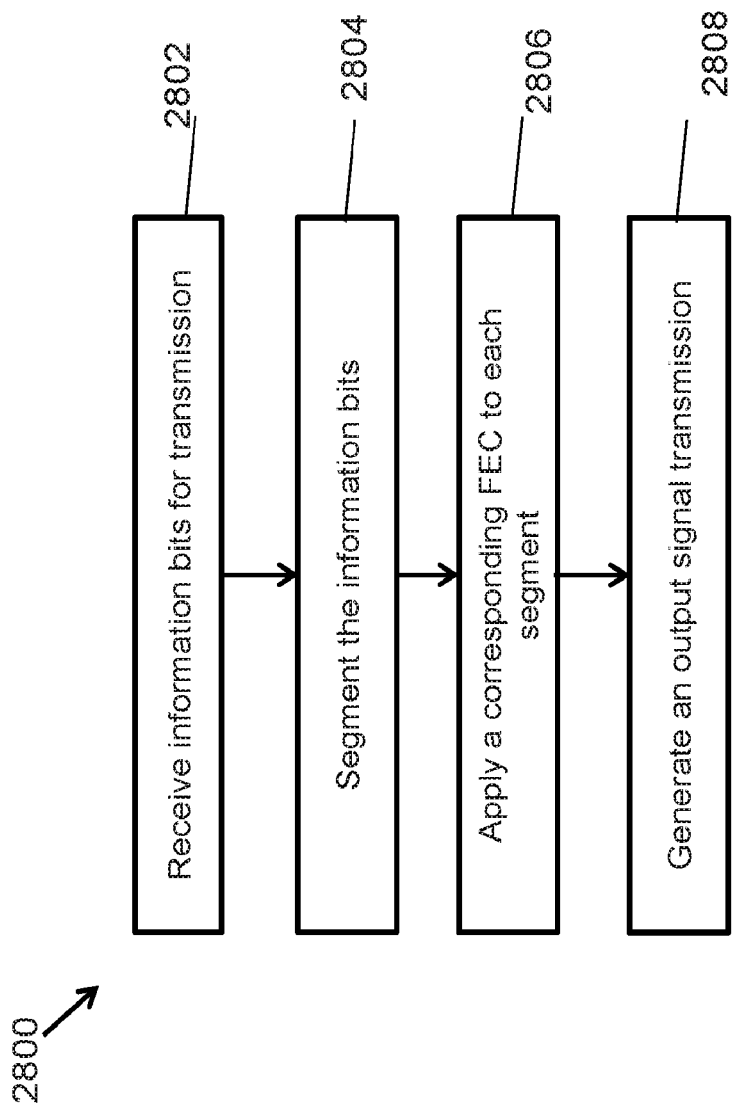
FIG. 28 shows an example of a wireless communication method.

FIG. 28 shows a flowchart representation of an example method 2800 of wireless signal transmission is disclosed. The method includes receiving information bits for transmission (2802), segmenting the information bits into a stream of segments (2804), applying a corresponding forward error correction (FEC) code to each of the stream of segments and combining outputs of the FECs to generate a stream of symbols (2806), and generating an output signal fortransmission (2808). The outputsignal generation operation 2808 may include processing thestream of symbols to generate awaveform, and transmitting the waveform over a communication medium. The processing of thestream of symbol may include operations such as digital to analog conversion, lowpass filtering, In some embodiments, the segmentation operation may comprise serial-to-parallel conversion of the information bits such that each segment has a size equal to the number of bits used to generateconstellations of a downstream modulation scheme. For example, 3 bits per segment may be used for 8 QAM modulation.

In some embodiments, the number of bits per segment may be equal to the block size for the downstream forward error correction scheme used. For example, 40 or 80 bit segments may be used for FEC block. In general, FECs with different error protection may be used and thus each FEC block may have a same number of bit size on the output (so that the outputs of each FEC can be combined to form symbols) but may have a different number of input bits. For example, the bit-expansion due to a stronger FEC code may mean fewer input bits will produce the same number of output FEC bits. However, in some embodiments, some FEC modules may have same input and output bit sizes but may offer different degrees of error correction coding due to algorithmic differences in the error correction code used for implementing the FEC.

In some embodiments, the transmission signal generation operation 606 may include application of a symplectic transform such as the OTFS transform to the signal to transform a corresponding delay-Doppler domain signal to a signal that is used for transmission.

Figure 29:
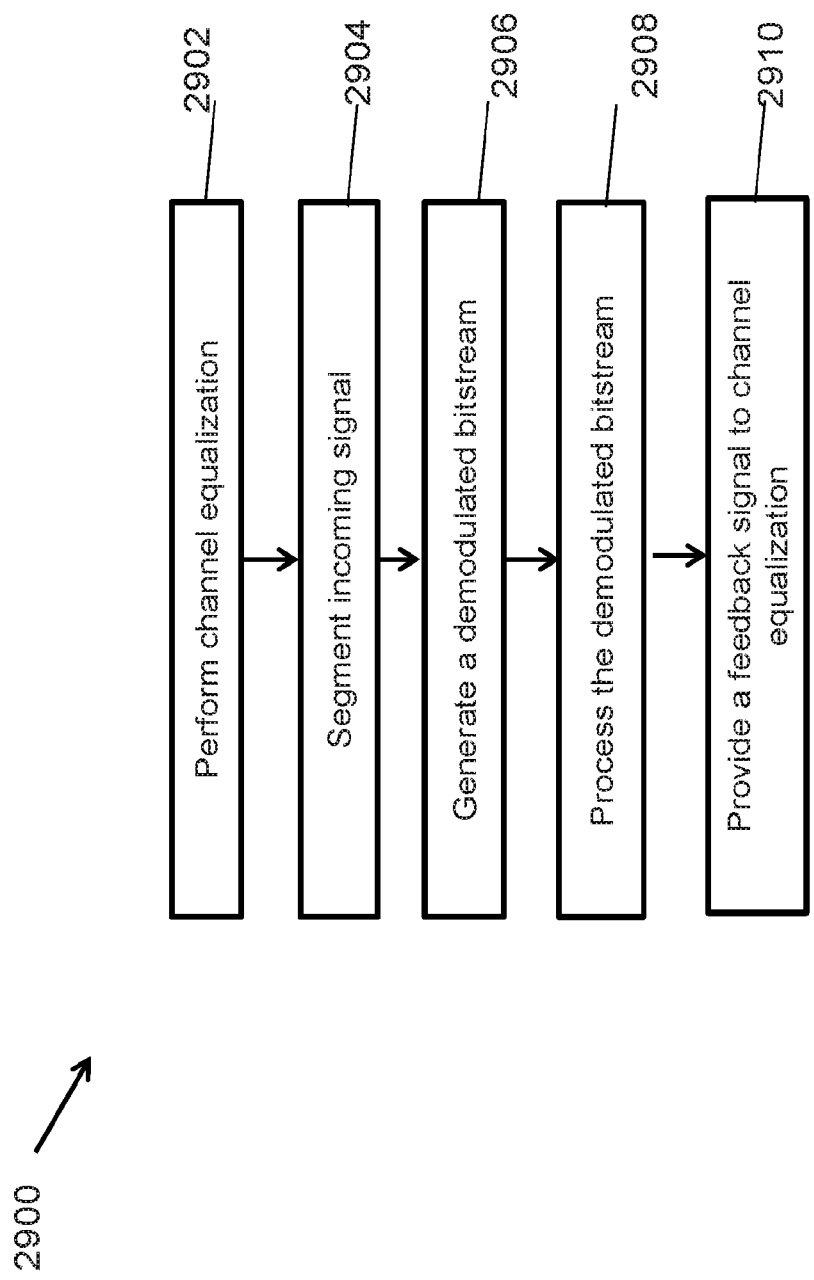
FIG. 29 shows an example of a wireless communication reception method.

FIG. 29 shows a flowchart for a wireless communication method 2900, implemented at a receiver-side. The method 2900 include performing channel equalization on the signal to generate a channel equalized signal (2902), logically dividing the channel equalized signal into a first number of segments, wherein the number of segment is equal to a second number of segments used at a transmitter-side to generate the signal (2904), demodulating and symbol demapping the channel equalization signal in successive steps such that each step operates to recover one or more bits of one of the number of the segments to generate a demodulated bitstream (2906), processing the demodulated bitstream to generate information related to the bits from the signal (2908), and providing a feedback signal to the channel equalization operation based on the processing of the demodulated bitstream (2910). The order in which the successive steps are performed depends on a reliability of success of recovering the one bit in each of the successive steps.

Figure 30:
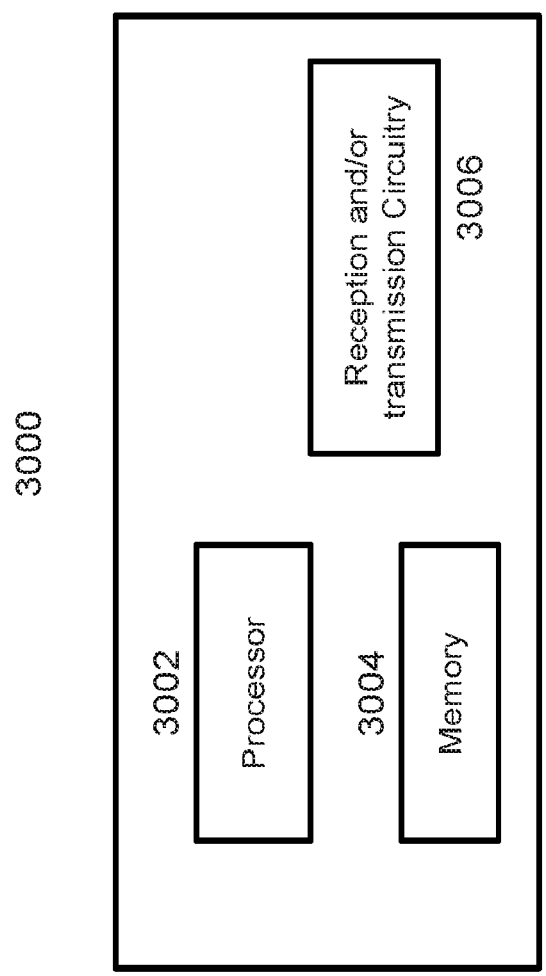
FIG. 30 shows an example of a wireless transceiver apparatus.

FIG. 30 shows an example of a wireless transceiver apparatus 3000. The apparatus 3000 may be used to implement method 200 or 300, or another method described herein. The apparatus 3000 includes a processor 3002, a memory 3004 that stores processor-executable instructions and data during computations performed by the processor. The apparatus 3000 includes reception and/or transmission circuitry 3006, e.g., including radio frequency operations for receiving or transmitting signals.

It will be appreciated that techniques for performing digital communication by modulating data using dispersed OTFS are disclosed. In some embodiments, symbol placement may be performed in a spread domain and transformed into a transformed domain from which they are mapped to the time-frequency domain, such that the placement of user data and reference signal is not limited to a pre-defined regular grid in the time-frequency domain.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A wireless communication method, comprising:
   modulating source data bits into a number Nd of constellation symbols;
   applying an invertible transform to the constellation symbols, resulting in mapping the transformed symbols into Nd elements in a time-frequency grid;
   generating a signal by inserting a reference signal and additional data along the time-frequency grid at locations unoccupied by the transformed symbols; and
   transmitting the signal resulting from the invertible transform over a communication channel.

2. The method of claim 1, wherein the mapping in the time-frequency grid includes a partial time-frequency grid, or a full time-frequency grid, or a continuous grid, or a non-continuous grid.

3. The method of claim 1, wherein the invertible transform and mapping results in spreading a given constellation symbol across multiple locations along the time-frequency grid.

4. The method of claim 3, wherein the multiple locations are non-continuous along the time-frequency grid.

5. The method of claim 1, wherein the invertible transform includes a symplectic Fourier transform, or a multi-dimensional Fourier transform, or a permutation transform.

6. The method of claim 1, wherein the modulating the source data bits includes modulating the source data bits using a multi-layer coding technique in which different constellation bits of a symbol are encoded separately.

7. The method of claim 1, wherein the number Nd of constellation symbols are constructed from interleaved coded bits.

8. The method of claim 1, wherein the applying the invertible transform includes arranging the constellation symbols into a multi-dimensional structure and applying the invertible transform to the multi-dimensional structure.

9. A wireless communication method, implementable at a receiver apparatus, comprising:
   receiving a signal comprising a logical grouping of Nd symbols arranged in a time-frequency grid, wherein the signal includes a reference signal along the time-frequency grid at locations unoccupied by the Nd symbols;
   generating equalized symbols by equalizing the signal by estimating a channel over which the signal is received;
   transforming the equalized symbols using an invertible transform into Nd estimated received symbol constellations; and
   recovering source data bits from the Nd estimated received symbol constellations.

10. The method of claim 9, wherein the time-frequency grid includes a partial time-frequency grid, or a full time-frequency grid, or a continuous grid, or a non-continuous grid.

11. The method of claim 9, wherein a given constellation symbol is spread across multiple locations along the time-frequency grid.

12. The method of claim 11, wherein the multiple locations are non-continuous along the time-frequency grid.

13. The method of claim 9, wherein the invertible transform includes a symplectic Fourier transform, or a multi-dimensional Fourier transform, or a permutation transform.

14. The method of claim 9, wherein the recovering includes at least one of (a) demodulating the source data bits using a multi-layer decoding technique in which different constellation bits of a symbol are decoded separately, or (b) deinterleaving bits from the Nd estimated received symbol constellations.

15. The method of claim 9, wherein the estimating the channel is based on the reference signal included in the time-frequency grid.

16. The method of claim 9, wherein the equalizing the received symbols is further based on a priori information about the Nd constellation symbols.

17. The method of claim 16, wherein the source data bits are recovered by:
   computing an extrinsic bit metrics based on the Nd estimated received symbol constellations;
   generating estimated coded source data bits from the Nd estimated received symbol constellations; and
   providing the estimated coded source data bits as the a priori information.

18. The method of claim 17, wherein the computing the extrinsic bit metrics is performed using a multi-layer coding scheme.

19. The method of claim 9, wherein the method is implemented iteratively on a layer by layer basis.

20. The method of claim 9, wherein the transforming the equalized symbols using the invertible transform includes arranging the equalized symbols into a multi-dimensional structure and applying the invertible transform to the multi-dimensional structure.

21. An apparatus for wireless communication, comprising:
   a processor; and
   a memory with instructions thereon, wherein the instructions upon execution by the processor cause the processor to:
   receive a signal comprising a logical grouping of Nd symbols arranged in a time-frequency grid, wherein the signal includes a reference signal and additional data along the time-frequency grid at locations unoccupied by the Nd symbols;
   generate equalized symbols by equalizing the signal by estimating a channel over which the signal is received;
   transform the equalized symbols using an invertible transform into Nd estimated received symbol constellations; and
   recover source data bits from the Nd estimated received symbol constellations.

22. The apparatus of claim 21, wherein the time-frequency grid includes a partial time-frequency grid, or a full time-frequency grid, or a continuous grid, or a non-continuous grid.

23. The apparatus of claim 21, wherein a given constellation symbol is spread across multiple locations along the time-frequency grid.

24. The apparatus of claim 23, wherein the multiple locations are non-continuous along the time-frequency grid.

25. The apparatus of claim 21, wherein the invertible transform includes a symplectic Fourier transform, or a multi-dimensional Fourier transform, or a permutation transform.

26. The apparatus of claim 21, wherein the recovering includes at least one of (a) demodulating the source data bits using a multi-layer decoding technique in which different constellation bits of a symbol are decoded separately, or (b) deinterleaving bits from the Nd estimated received symbol constellations.

27. The apparatus of claim 21, wherein the estimating the channel is based on the reference signal included in the time-frequency grid.

28. The apparatus of claim 21, wherein the equalizing the received symbols is further based on a priori information about the Nd constellation symbols.

29. The apparatus of claim 21, wherein the instructions are executed iteratively on a layer by layer basis.

30. The apparatus of claim 21, wherein the transforming the equalized symbols using the invertible transform includes arranging the equalized symbols into a multi-dimensional structure and applying the invertible transform to the multi-dimensional structure.

* * * * *